(12) United States Patent
Lee et al.

(10) Patent No.: US 12,386,579 B2
(45) Date of Patent: Aug. 12, 2025

(54) SCREEN SHARING METHOD AND ELECTRONIC DEVICE THEREFOR

(71) Applicant: SAMSUNG ELECTRONICS CO., LTD., Suwon-si (KR)

(72) Inventors: Miyoung Lee, Suwon-si (KR); Donggoo Kang, Suwon-si (KR); Hyunjin Kim, Suwon-si (KR); Jooyoon Bae, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/374,267

(22) Filed: Sep. 28, 2023

(65) Prior Publication Data
US 2024/0020084 A1    Jan. 18, 2024

Related U.S. Application Data

(63) Continuation of application No. PCT/KR2022/004115, filed on Mar. 24, 2022.

(30) Foreign Application Priority Data

Apr. 6, 2021    (KR) .......................... 10-2021-0044601

(51) Int. Cl.
*G06F 3/14*    (2006.01)
*G06F 3/0484*    (2022.01)
(Continued)

(52) U.S. Cl.
CPC .......... *G06F 3/1454* (2013.01); *G06F 3/0484* (2013.01); *G06F 3/1446* (2013.01);
(Continued)

(58) Field of Classification Search
CPC .... G06F 3/1454; G06F 3/0484; G06F 3/1446; G06F 3/1423; G06T 7/20; G06T 7/60;
(Continued)

(56) References Cited

U.S. PATENT DOCUMENTS

| 8,823,602 B2 | 9/2014 | Yada |
| 10,310,727 B2 | 6/2019 | Park et al. |

(Continued)

FOREIGN PATENT DOCUMENTS

| JP | 5892408 B2 | 3/2016 |
| KR | 100699091 B1 | 3/2007 |

(Continued)

OTHER PUBLICATIONS

International Search Report for International Application No. PCT/KR2022/004115; International Filing Date Mar. 24, 2022; Date of Mailing Jun. 30, 2022; 6 Pages.

*Primary Examiner* — Hong Zhou
(74) *Attorney, Agent, or Firm* — CANTOR COLBURN LLP

(57) ABSTRACT

An electronic device includes a communication circuit, a display, a memory, and a processor operatively connected to the communication circuit, the display, and the memory. The memory is configured to store one or more instructions which, when executed, allow the processor to: establish a communication connection, for screen sharing, with an external electronic device via the communication circuit; determine a first area, which is shared with the external electronic device, in a screen output on the display; identify a second area, which is selected based on a user input, in the screen; and transmit, to the external electronic device, image data of a third screen in which a first screen corresponding to the first area and a second screen corresponding to the second area are synthesized.

18 Claims, 15 Drawing Sheets

(51) Int. Cl.
  *G06T 7/20* (2017.01)
  *G06T 7/60* (2017.01)
  *G06T 7/70* (2017.01)
  *G06V 20/62* (2022.01)
  *G06V 40/10* (2022.01)

(52) U.S. Cl.
  CPC .................. *G06T 7/20* (2013.01); *G06T 7/60* (2013.01); *G06T 7/70* (2017.01); *G06V 20/62* (2022.01); *G06V 40/10* (2022.01); *G06T 2200/24* (2013.01); *G06T 2207/20092* (2013.01); *G06T 2207/30196* (2013.01)

(58) Field of Classification Search
  CPC .................. G06T 7/70; G06T 2200/24; G06T 2207/20092; G06T 2207/30196; G09G 2320/0613; G09G 2354/00; G09G 5/14; G09G 2340/10; G09G 2360/04; G06V 20/62; G06V 40/10
  See application file for complete search history.

(56) References Cited

U.S. PATENT DOCUMENTS

| | | |
|---|---|---|
| 10,489,918 B1 | 11/2019 | Vajapey et al. |
| 10,509,618 B2 | 12/2019 | Chun |
| 10,623,662 B2 | 4/2020 | Li et al. |
| 10,908,866 B2 | 2/2021 | Chun |
| 11,159,743 B2 | 10/2021 | Li et al. |
| 2006/0221237 A1 | 10/2006 | Min et al. |
| 2011/0181492 A1* | 7/2011 | Soeda ............... G09G 5/14 345/1.1 |
| 2012/0060109 A1* | 3/2012 | Han ............... G09G 5/14 455/418 |
| 2013/0219303 A1* | 8/2013 | Eriksson ............... G06F 3/1454 715/759 |
| 2014/0026068 A1* | 1/2014 | Park ............... H04N 21/41265 715/748 |
| 2015/0082241 A1 | 3/2015 | Kang et al. |
| 2016/0092154 A1 | 3/2016 | Bourlier et al. |
| 2016/0259611 A1 | 9/2016 | Park et al. |
| 2018/0364881 A1* | 12/2018 | Lee ............... G06F 3/04886 |
| 2020/0151884 A1* | 5/2020 | Vajapey ............... G06T 7/20 |
| 2020/0380901 A1* | 12/2020 | Ryu ............... G06F 3/1423 |

FOREIGN PATENT DOCUMENTS

| | | |
|---|---|---|
| KR | 101059134 B1 | 8/2011 |
| KR | 20140133081 A | 11/2014 |
| KR | 101594105 B1 | 2/2016 |
| KR | 20170025562 A | 3/2017 |
| KR | 20170111003 A | 10/2017 |
| KR | 20180043712 A | 4/2018 |
| KR | 20190041090 A | 4/2019 |
| KR | 20190054494 A | 5/2019 |
| KR | 102066857 B1 | 1/2020 |
| KR | 102084633 B1 | 3/2020 |
| KR | 102210704 B1 | 2/2021 |

\* cited by examiner

SCREEN SHARING METHOD AND ELECTRONIC DEVICE THEREFOR

CROSS-REFERENCE TO RELATED APPLICATIONS

This application is a continuation application under, 35 U.S.C. § 111(a), of International Patent Application No. PCT/KR2022/004115, filed on Mar. 24, 2022, which claims priority to Korean Patent Application No. 10-2021-0044601, filed on Apr. 6, 2021, the content of which in their entirety is herein incorporated by reference.

BACKGROUND

1. Field

Embodiments of the disclosure described herein relate to a method of sharing a screen between electronic devices, and an electronic device therefor.

2. Description of Related Art

Screen mirroring technology is a technology for sharing and manipulating screen data between electronic devices including display devices. Based on the screen mirroring technology, an electronic device may display a screen displayed through a display device thereof on a display device of another electronic device. For example, the screen mirroring technology may be used to provide a larger screen to a user by outputting a small screen of a smart phone through a relatively large screen of a television (TV).

The screen mirroring technology is being developed so as to be widely applied between various electronic devices capable of outputting screens, such as smart phones, tablet computers, notebook computers, or TVs, based on the development of various communication technologies.

When a screen is shared between electronic devices, the entire region of the screen displayed on a display of the host device (or, the source device) may be displayed on a display of the client device (or, the sink device).

SUMMARY

An electronic device according to an embodiment of the disclosure includes communication circuitry, a display, a memory, and a processor operationally connected to the communication circuitry, the display, and the memory. The memory stores one or more instructions that, when executed, cause the processor to establish a communication connection for screen sharing with an external electronic device through the communication circuitry, determine a first region shared with the external electronic device on a screen that is output on the display, identify a second region selected on the screen based on a user input, and transmit, to the external electronic device, image data about a third screen obtained by combining a first screen corresponding to the first region and a second screen corresponding to the second region.

A method for sharing, by an electronic device, a screen with an external electronic device according to an embodiment of the disclosure includes establishing a communication connection for screen sharing with the external electronic device through communication circuitry of the electronic device, determining a first region shared with the external electronic device on a screen that is output on a display of the electronic device, identifying a second region selected on the screen based on a user input, and transmitting, to the external electronic device, image data about a third screen obtained by combining a first screen corresponding to the first region and a second screen corresponding to the second region.

A computer program product stored on a machine-readable storage medium, according to an embodiment of the disclosure includes, includes instructions that, when executed, cause a processor of an electronic device to establish a communication connection for screen sharing with an external electronic device, determine a first region shared with the external electronic device on a screen that is output on a display of the electronic device, identify a second region selected on the screen based on a user input, and transmit, to the external electronic device, image data about a third screen obtained by combining a first screen corresponding to the first region and a second screen corresponding to the second region.

It may be useful to expand a region specified by a user on a screen displayed on a host device and simultaneously output a user-specified region and the entire region on a display of a client device. In addition, the electronic device can determine the layout of the screen displayed on the display of the client device depending on characteristics of an object that the user wants to zoom in on.

Various embodiments of the disclosure provide an electronic device that, when a screen is shared between electronic devices, allows a user to select a region the user wants to enlarge on a screen of a host device and outputs a screen corresponding to the selected region and a screen displayed through a display of a client device together, and an operating method thereof. In addition, various embodiments of the disclosure provide an electronic device that determines a layout of a plurality of screens displayed on a display of a client device depending on characteristics of an object included in a user-specified region, and an operating method thereof.

According to the various embodiments of the disclosure, when the screen is shared between the electronic devices, the electronic device and the operating method thereof may allow the user to select the region that the user wants to enlarge on the screen of the host device and may output the screen corresponding to the selected region and the screen displayed through the display of the client device together.

Furthermore, according to the various embodiments of the disclosure, the electronic device and the operating method thereof may determine the layout of the plurality of screens displayed on the display of the client device depending on the characteristics of the object included in the user-specified region.

In addition, the disclosure may provide various effects that are directly or indirectly recognized.

BRIEF DESCRIPTION OF DRAWINGS

The above and other exemplary embodiments, advantages and features of this disclosure will become more apparent by describing in further detail exemplary embodiments thereof with reference to the accompanying drawings, in which.

In the following description made with respect to the accompanying drawings, identical or similar components will be assigned with identical or similar reference numerals.

DETAILED DESCRIPTION

Figure 1:
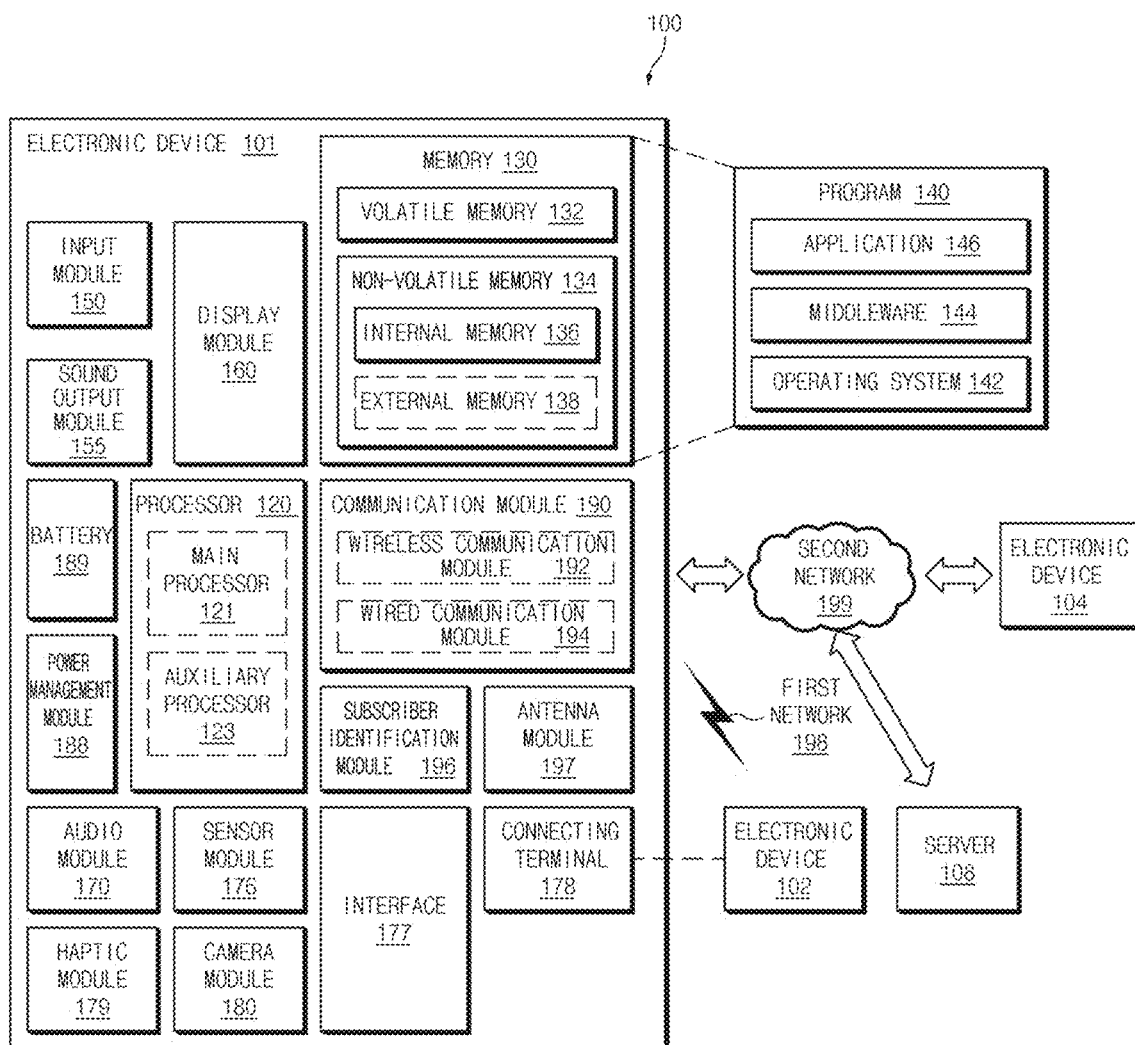
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electro device 102 via a first network 198 (e.g., a short-wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least e other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used fir receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an operation of an electronic device according to an embodiment will be described with reference to FIG. 2.

Figure 2:
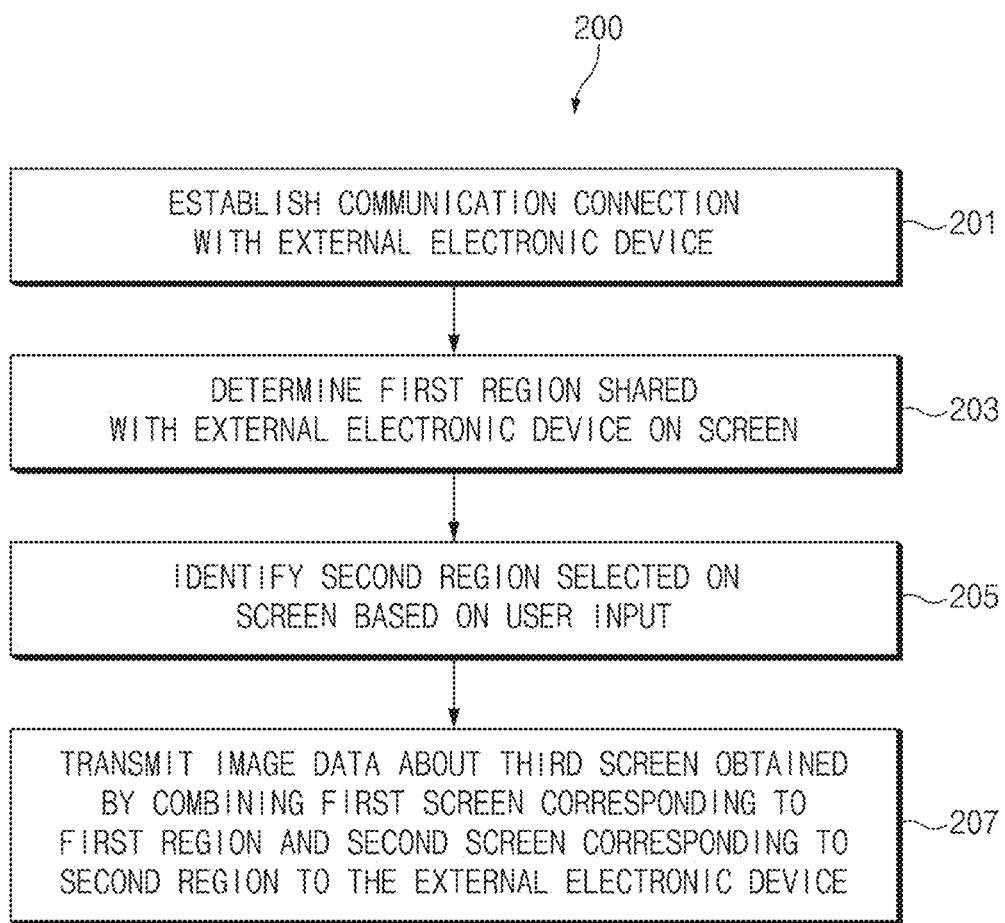
FIG. 2 is a flowchart illustrating an operation of an electronic device according to an embodiment.

FIG. 2 is a flowchart 200 illustrating an operation of the electronic device according to an embodiment. Operations of the electronic device that will be described below may be performed by the electronic device 101 of FIG. 1 or the processor 120 of the electronic device 101.

According to an embodiment, the electronic device may execute a mirroring function before performing the operations illustrated in FIG. 2. The mirroring function in the disclosure may refer to a function of simultaneously outputting, through an image output device (e.g., a display) of an external electronic device (e.g., the electronic device 102 or 104 of FIG. 1) communicating with the electronic device, at least one region of a screen that is output on a display of the electronic device (e.g., the display module 160 of FIG. 1) as if it is reflected in a mirror. For example, the electronic device may transmit pixel information of the screen output on the display to the external electronic device in real time, and the external electronic device may output the screen output on the display of the electronic device, based on the pixel information transmitted in real time. In the disclosure, mirroring may be referred to as screen sharing. According to an embodiment, the electronic device may determine a target electronic device as the mirroring function is executed. For example, the electronic device may display, on the display, a list of external electronic devices that support the mirroring function and that are wiredly or wirelessly connected with the electronic device. The electronic device may determine the target electronic device, based on a user input for selecting at least one external electronic device from the list of the external electronic devices that is displayed on the display.

In operation 201, the electronic device may establish a communication connection with the external electronic device. According to an embodiment, the electronic device may establish a communication connection for screen sharing with the external electronic device through communication circuitry (e.g., the communication module 190 of FIG. 1). The electronic device may establish a communication connection for screen sharing with an external electronic device selected from the list of the external electronic devices that is displayed on the display. The electronic device may transmit screen data to the external electric device communicatively connected with the electronic device.

In operation 203, the electronic device may determine a first region shared with the external electronic device on the screen. According to an embodiment, the electronic device may determine the first region shared with the external electronic device on the screen that is output on the display (e.g., the display module 160 of FIG. 1). According to an embodiment, the first region may be a mirroring region. According to an embodiment, the electronic device may receive an input for selecting the first region. According to an embodiment, the electronic device may receive, from a user of the electronic device, the input for selecting the first region on the screen output on the display. According to an embodiment, the first region may include the entire region or a partial region of the screen output on the display of the electronic device. For example, the input for selecting the first region may include a user input for setting the entire region of the screen output on the display of the electronic device as the mirroring region. In this case, the first region may be the entire region of the screen. In another example, the input for selecting the first region may include a user input for selecting one of at least one region provided by the electronic device. The at least one region may include a region on which contents (e.g., an image, a video, a comment window, or a chatting window) are output. In this case, the first region may be a region selected by the user input among the at least one region. In another example, the input for selecting the first region may include a user input for specifying a specific region by a drag operation.

According to an embodiment, the electronic device may form one screen (or, frame) that is to be transmitted to the external electronic device, by combining an image corresponding to the first region with one frame depending on a resolution determined through negotiation with the external electronic device. According to an embodiment, the electronic device may transmit information about the formed screen (or, frame) to the external electronic device. According to an embodiment, the information about the screen may include image data about the screen. For example, the image data may include image data or video data. According to an embodiment, the electronic device rang transmit the image data about the screen formed to correspond to the first region to the external electronic device. According to an embodiment, the external electronic device may output the screen received from the electronic device through the display of the external electronic device.

In operation 205, the electronic device may identify a second region selected on the screen based on a user input. According to an embodiment, the electronic device may identify the second region selected on the screen output on the display of the electronic device, based on the user input. According to an embodiment, the user input may include an input for selecting an object included in the screen output on the display. For example, the electronic device may recognize at least one object included in the screen output on the display. The electronic device may output an image of the at least one recognized object on the display and may receive, from the user, an input for selecting one of the at least output image. According to an embodiment, the input for selecting the image corresponding to the object may be an input for selecting the object. According to an embodiment, the electronic device may recognize the object corresponding to the image selected by the user, based on object recognition technology. According to an embodiment, the electronic device may identify a region including the recognized object as the second region.

According to an embodiment, as the screen output on the display of the electronic device changes, the position of an object on the screen may be changed. According to an embodiment, the electronic device may track a change in the position of a recognized object on the screen and may identify the second region including the object, based on the tracked position of the object.

In operation 207, the electronic device may transmit, to the external electronic device, image data about a third screen obtained by combining a first screen corresponding to the first region and a second screen corresponding to the second region. According to an embodiment, the first screen corresponding to the first region may refer to an image corresponding to the first region. According to an embodiment, the second screen corresponding to the second region may refer to an image corresponding to the second region. According to an embodiment, the electronic, device may form one screen (or, frame) that is to be transmitted to the external electronic device, by combining the image corresponding to the first region and the image corresponding to the second region with one frame depending on a resolution determined through negotiation with the external electronic device. According to an embodiment, the screen formed by combining the first screen and the second screen by the electronic device may be referred to as the third screen. According to an embodiment, the third screen may refer to an image in which the image corresponding to the first region and the image corresponding to the second region are combined in one frame. According to an embodiment, the third screen may be configured as a multi-window. According to an embodiment, the third screen may include a first window corresponding to the first screen and a second window corresponding to the second screen. According to an embodiment, the first window may be referred to as a main window, and the second window may be referred to as a focus window. According to an embodiment, the electronic device may generate the first window and the second window, based on the layout of the third screen determined depending on an operation of determining the layout of the third screen, which will be described below. According to an embodiment, the electronic device may determine to crop the image corresponding to the first region on the screen output on the display and output the cropped image through the first and may determine to crop the image corresponding to the second region on the screen output on the display and output the cropped image through the second window.

According to an embodiment, the electronic device may identify the type of an object included in the second region. According to an embodiment, the electronic device may determine the layout of the third screen, based on the type of the object. According to an embodiment, the layout of the third screen may include the width to height ratio of the second region and the position of the second screen relative to the first screen on the third screen.

According to an embodiment, the type of the object may include a person, an object, or text. According to an embodiment, when it is determined that the type the object is a person, the electronic device may determine the width to height ratio of the second region as a ratio in which a vertical length is greater than a horizontal length. For example, when the type of the object is a person, there may be a high probability that the upper body or the whole body of the person is included in the screen output on the display of the electronic device. In other words, when the type of the object is a person, there may be a high probability that the width to height ratio of the object recognized on the screen output on the display of the electronic device is a ratio in which a vertical length is greater than a horizontal length. Accordingly, based on the fact that the type of the object is a person, the electronic device may omit determination of the width to height ratio of the object and may determine the width to height ratio of the second region as a ratio in which a vertical length is greater than a horizontal length.

According to an embodiment, the electronic device may identify the width to height ratio of the object. For example, when the type of the object is an object, the electronic device may identify the width to height ratio of the object by determining whether the horizontal length of the object is greater than the vertical length of the object. In another example, when the type of the object is text, the electronic device may identify the width to height ratio of the object by determining whether the horizontal length of a region including the text or a text box is greater than the vertical length thereof. According to an embodiment, when it is determined that the vertical length of the object is greater than the horizontal length of the object, the electronic device may determine the width to height ratio of the second region as a ratio in which a vertical length is greater than a horizontal length. According to an embodiment, when it is determined that the horizontal length of the object is greater than the vertical length of the object, the electronic device may determine the width to height ratio of the second region as a ratio in which a horizontal length is greater than a vertical length.

According to an embodiment, the electronic device may determine the position of the second screen relative to the first screen on the third screen, based on at least one of the width to height ratio of the first region or the width to height ratio of the second region. According to an embodiment, the width to height ratio of the first region may be determined as the electronic device determines the first region. According to an embodiment, the width to height ratio of the second region may be determined based on at least one of the type of the object included in the second region or the width to height ratio of the object.

According to an embodiment, when the width to height ratio of the second region is determined as a ratio in which a vertical length is greater than a horizontal length, the electronic device may determine to locate the second screen on the left or right side of the first screen on the third screen. According to an embodiment, when the width to height ratio of the second region is determined as a ratio in which a horizontal length is greater than a vertical length, the electronic device may determine to locate the second screen on the left or right side of the first screen on the third screen depending on the width to height ratio of the first region. According to an embodiment, when the width to height ratio of the second region is determined as a ratio in which a horizontal length is greater than a vertical length and the width to height ratio of the first region is determined as a ratio in which a horizontal length is greater than a vertical length, the electronic device may determine to locate the second screen on the upper or lower side of the first screen on the third screen. According to an embodiment, when the width to height ratio of the second region is determined as a ratio in which a horizontal length is greater than a vertical length and the width to height ratio of the first region is determined as a ratio in which a vertical length is greater than a horizontal length, the electronic device may determine to locate the second screen on the left or right side of the first screen on the third screen.

According to the above-described embodiment, the electronic device may determine the second region by recognizing and tracking the object on the screen output on the display of the electronic device. According to an embodiment, the electronic device may form (or, generate) the third screen by combining the second screen corresponding to the second region at the time point when the position of the object was most recently recognized with the first screen when the position of the object is not recognized on the screen. Here, the first screen may be a screen corresponding to the first region at the current time point. According to an embodiment, the electronic device may form the third screen by combining the second screen corresponding to the second region at the time point when the position of the object was most recently recognized and the first screen corresponding to the first region at the current time point.

According to an embodiment, when an object moves out of the screen or a feature point of the object is not recognized, the electronic device may determine that the position of the object is not recognized on the screen. For example, when the type of the object is a person, the electronic device may recognize the object, based on a feature point of the face. In this case, as the recognized object is changed to the back of the object, the electronic device may determine that the position of the object is not able to be recognized. According to an embodiment, when it is determined that the position of the object is not recognized on the screen, the electronic device is not able to determine the second region and is not able to obtain information about the second screen corresponding to the second region. According to an embodiment, when it is determined that the position of the object is not recognized on the screen, the electronic device may form the third screen, based on the most recently obtained information about the second screen. According to an embodiment, the time point when the electronic device most recently obtained information about the second screen may be a time point prior to the point time when the electronic device determines that the position of the object is not recognized on the screen. For example, when the electronic device outputs, on the display, a video in which an object moves, the screen output on the second window of the third screen may change as time passes. In this case, when it is determined that the position of the object is not recognized on the screen output on the display, the electronic device may form the third screen by reusing the most recently obtained information about the second screen, and thus the screen output on the second window of the third screen may be the same as that at the previous time point. Accordingly, the user may recognize that the screen output on the second window is paused on the third screen output through the external electronic device.

According to an embodiment, when an object is re-recognized on the screen output on the display, the electronic device may determine the second region including the re-recognized object and may obtain information about the second screen corresponding to the second region. According to an embodiment, when the object appears in a state in which there is no object on the screen or when a feature point of the object is recognized in a state in which the feature point of the object is not recognized, the electronic device may determine that the object is re-recognized on the screen. According to an embodiment, the electronic device ray obtain information about the second screen corresponding to the second region including the re-recognized object and may form the third screen, based on the obtained information about the second screen. As the electronic device re-recognizes the object on the screen output on the display, the electronic device may form the third screen using the information about the second screen corresponding to the second region including the re-recognized object, and thus the screen output on the second window of the third screen mass be different from that at the previous time point and may change as time passes. Accordingly the user may recognize that the screen output on the second window of the third screen output through the external electronic device is reproduced out of the pause state.

According to an embodiment, when it is determined that the type of the object is text, the electronic device may determine whether the background of the object changes on the second screen as time passes. For example, when the object is text (or, a text box) and the text is output to overlap an image or video that changes as time passes, the electronic device may determine that the background of the object changes as time passes. According to an embodiment, as the background of the text changes, it may be difficult to identify the text. According to an embodiment, when it is determined that the background of the object changes as time passes, the electronic device may adjust the background of the object on the second screen. According to an embodiment, the electronic device may generate a fourth screen by adjusting the background of the object on the second screen by performing image processing on the second screen. For example, the electronic is device may generate the fourth screen corresponding to the second region by blurring the background of the object or adjusting the brightness of the background of the object on the second screen corresponding to the second region. According to an embodiment, the electronic device may form the third screen by combining the fourth screen with the first screen. According to an embodiment, when the type of the object included in the second region is text and the background of the object changes as time passes, the electronic device may adjust the background of the object by processing the image corresponding to the second region and may form the third screen in which the image corresponding to the first region and the image corresponding to the second region and having the adjusted background of the object are combined in one frame.

According to an embodiment, the electronic device may transmit image data about the third screen formed to correspond to the first region and the second region to the external electronic device. According to an embodiment, the external electronic device may output the third screen received from the electronic device through the display of the external electronic device.

Hereinafter, an operation of sharing a screen output on a main window of a screen output on an external electronic device by an electronic device according to an embodiment will be described with reference to FIG. 3. When the screen output on the external electronic device is a single screen that is not divided, the main window may refer to an output region of the single screen, and when the screen output on the external electronic device is a screen including a plurality of split screens, the main window may refer to an output region of the largest screen among the plurality of split screens.

Figure 3:
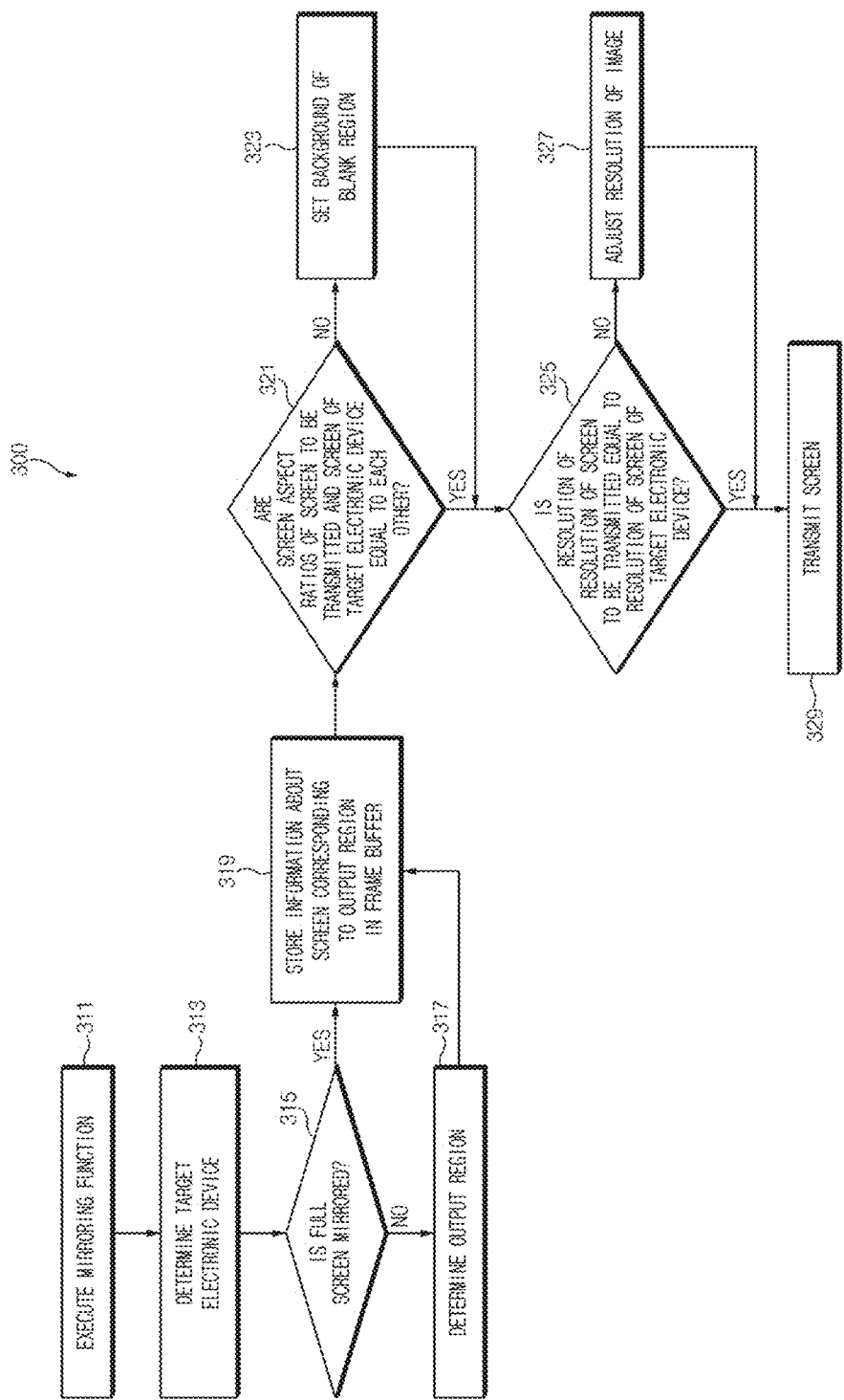
FIG. 3 is a flowchart illustrating an operation of an electronic device according to an embodiment.

FIG. 3 is a flowchart 300 illustrating an operation of the electronic device according to an embodiment. Operations of the electronic device that will be described below may be performed by the electronic device 101 of FIG. 1 or the processor 120 of the electronic device 101. According to an embodiment, the operations of the electronic device that will be described below may correspond to operation 201 and operation 203 of FIG. 2.

In operation 311, the electronic device may execute a mirroring function. According to an embodiment, when the electronic device receives an input for executing the mirroring function, the electronic device may execute the mirroring function.

In operation 313, the electronic device may determine a target electronic device. According to an embodiment, the electronic device may determine the target electronic device as the mirroring function is executed. For example, the electronic device may display, on a display, a list of external electronic devices that support the mirroring function and that are wiredly or wirelessly connected with the electronic device. The electronic device may determine the target electronic device, based on a user input for selecting at least one external electronic device from the list of the external electronic devices that is displayed on the display. According to an embodiment, when the electronic device receives the user input for selecting the at least one external electronic device, the electronic device may establish a communication connection for screen sharing with the selected external electronic device. For example, the electronic device may communicate with the external electronic device through WiFi direct.

In operation 315, the electronic device may determine whether to mirror a full screen. According to an embodiment, the electronic device may display a user interface for determining whether to mirror the full screen or whether to mirror a region selected by a user. When the electronic device receives, through the user interface, a user input for setting the full screen as a mirroring region (operation 315-YES), the electronic device may determine the entire display region of the display of the electronic device (e.g., the display module 160 of FIG. 1) as an output region that is to be output on the external electronic device.

According to an embodiment, when the electronic device receives, through the user interface, a user input for setting a region selected by the user as a mirroring region (operation 315-NO), the electronic device may provide at least one region as a candidate for an output region. For example, the electronic device may provide the candidate for the output region by displaying a guide line along the periphery of the at least one region. For example, the electronic device may provide a screen aspect ratio at which a screen corresponding to the at least one region is output on the external electronic device. According to an embodiment, the at least one region may include a region on which contents (e.g., an image, a video, a comment window, or a chatting window) is output. According to an embodiment, when the electronic device receives a user input for selecting one of the at least one region, the electronic device may determine the selected region as an output region that is to be output on the external electronic device (operation 317).

According to another embodiment, when the electronic device receives, through the user interface, a user input for setting a region selected by the user as a mirroring region, the electronic device may provide a user interface for specifying the mirroring region to the user through the display. For example, the user may specify the mirroring region through a drag input. According to an embodiment, when the electronic device receives the user input for specifying the mirroring region, the electronic device may determine the specified region as an output region that is to be output on the external electronic device (operation 317).

In operation 319, the electronic device may store information about a screen corresponding to the output region in a frame buffer. According to an embodiment, the frame buffer may be a memory that stores information about a screen transmitted to the external electronic device by the electronic device and output by the external electronic device. According to an embodiment, the information about the screen may include image data about the screen. For example, the image data may include image data or video data. The electronic device may configure (form or generate) one screen that is to be transmitted to the external electronic device, by storing, in the frame buffer, the information about the screen corresponding to the output region determined by operation 315 or 317 on the screen output on the display of the electronic device. According to an embodiment, the screen configured in the frame buffer may include the main window.

In operation 321, the electronic device may determine whether the screen to be transmitted and a screen of the target electronic device have the same screen aspect ratio (or, the same width to height ratio). According to an embodiment, the screen to be transmitted may refer to the screen (or, image) corresponding to the output region determined in operation 315 or 317. According to an embodiment, the screen aspect ratio of the screen to be transmitted may refer to the width to height ratio of the determined output region. For example, the electronic device may identify information about the screen aspect ratio and the resolution of the screen to be transmitted, based on information about the number of pixels of the screen (or, image) corresponding to the determined output region. The information about the screen aspect ratio and the resolution of the screen to be transmitted may be determined by the numbers of horizontal pixels and vertical pixels of the screen (or, image) corresponding to the determined output region. According to an embodiment, the screen of the target electronic device may refer to the screen configured in the frame buffer by the electronic device so as to be output on the target electronic device. According to an embodiment, the screen of the target electronic device may refer to the main window. According to an embodiment, the screen aspect ratio of the screen of the target electronic device may refer to the width to height ratio of the main window. According to an embodiment, the electronic device may determine the screen aspect ratio and the resolution of the main window through negotiation with the target electronic device. For example, the electronic device may obtain information about the screen aspect ratio and the resolution of the display of the target electronic device from the target electronic device and may determine the screen aspect ratio and the resolution of the main window, based on the obtained information. According to an embodiment, the electronic device may determine whether the determined screen aspect ratio of the main window is equal to the screen aspect ratio of the screen to be transmitted.

According to an embodiment, when it is determined that the screen aspect ratio of the screen to be transmitted is Trot equal to the screen aspect ratio of the main window (operation 321-NO), the electronic device may perform operation 323. In operation 323, the electronic device may place the screen to be transmitted on the main window and may set the background of the remaining blank region. For example, the electronic device may place the screen to be transmitted depending on a smaller one of the horizontal length and the vertical length of the main window and may set the background of the blank region as an image having a specified color or a blurred image. According to an embodiment, when it is determined that the screen aspect ratio of the screen to be transmitted is equal to the screen aspect ratio of the main window (operation 321-YES), the electronic device may perform operation 325. According to an embodiment, the electronic device may perform operation 325 after performing operation 323.

In operation 325, the electronic device may determine whether the screen to be transmitted and the screen of the main window have the same resolution. According to an embodiment, when it is determined that the resolution of the screen to be transmitted is not equal to the resolution of the main window (operation 325-NO), the electronic device may perform operation 327. In operation 327, the electronic device may match the resolution of the screen to be transmitted, that is, the resolution of the image corresponding to the output region determined in operation 315 or 317 with the resolution of the main window. According to an embodiment, when it is determined that the resolution of the screen to be transmitted is equal to the resolution of the main window (operation 325-YES), the electronic device may perform operation 329. According to an embodiment, the electronic device may perform operation 329 after performing operation 327.

In operation 329, the electronic device may transmit the screen. According to an embodiment, the electronic device may transmit the information about the screen configured in the frame buffer to the target electronic device. According to an embodiment, the electronic device may transmit the image data about the screen configured in the frame buffer to the target electronic device. For example, the electronic device may transmit the image stored in the frame buffer to the target electronic device. According to an embodiment, the target electronic device may output the screen transmitted from the electronic device on the display. According to an embodiment, the screen output on the target electronic device may include the main window on which the screen corresponding to the region that the electronic device determines as the mirroring region on the screen output on the display of the electronic device is output.

Hereinafter, a user interface displayed by an electronic device to share a screen output on a main window of a screen output on an external electronic device according to an embodiment will be described with reference to FIG. 4.

Figure 4:
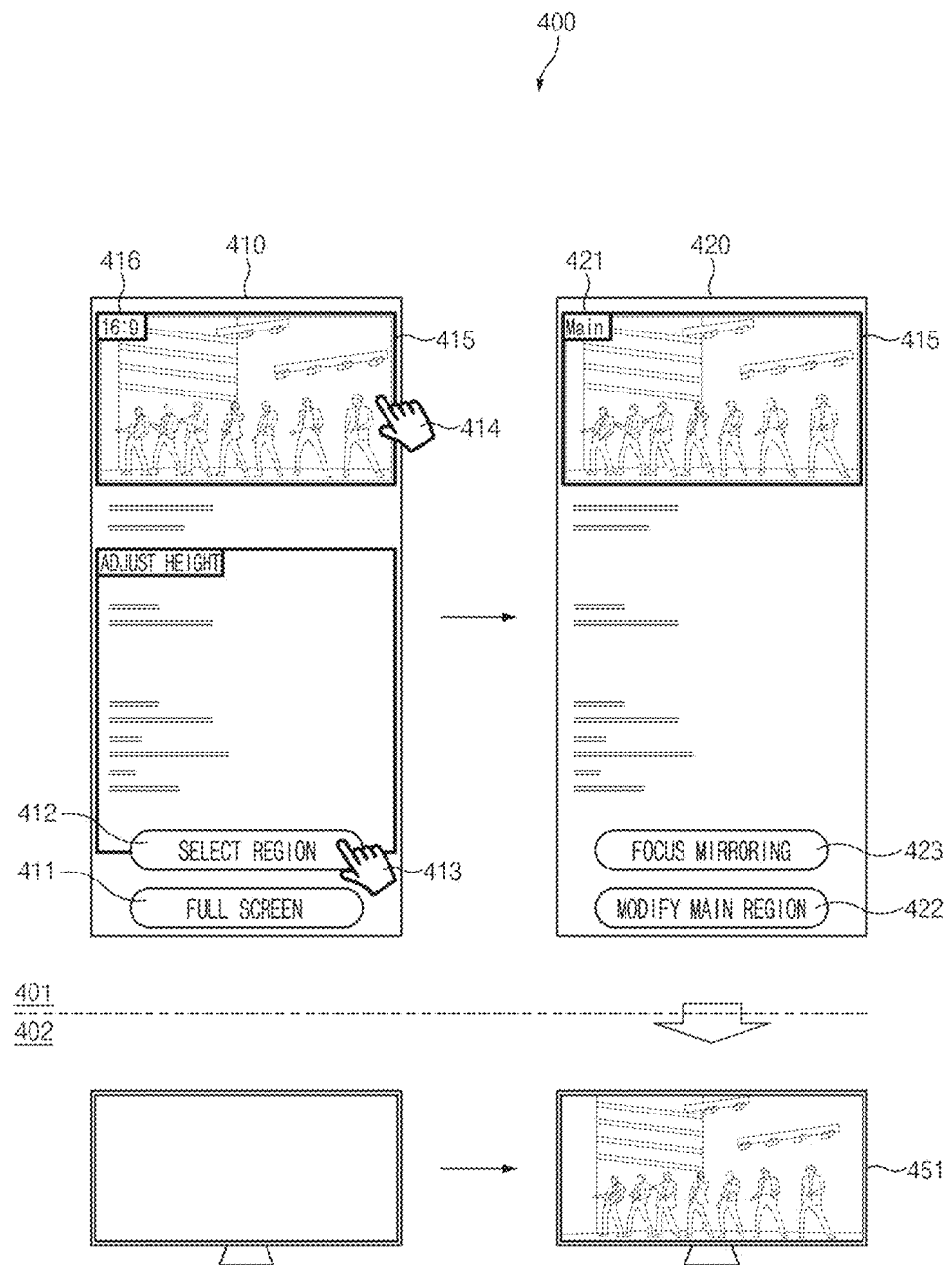
FIG. 4 is a view illustrating a user interface provided by an electronic device according to an embodiment.

FIG. 4 is a view 400 illustrating the user interface provided by the electronic device according to an embodiment. Operations of the electronic device 401 (e.g., the electronic device 101 of FIG. 1) that will be described below may be performed by a processor (e.g., the processor 120 of FIG. 1) of the electronic device 401. According to an embodiment, a first screen 410 and a second screen 420 may be screens displayed on a display (e.g., the display module 160 of FIG. 1) by the electronic device 401.

Referring to the first screen 410 of FIG. 4, the electronic device 401 may display a user interface for determining whether to mirror a full screen or whether to mirror a region selected by a user. For example, the electronic device 401 may display a user interface that includes a first button 411 onto which an operation of setting the full screen as a mirroring region is mapped and a second button 412 onto which an operation of setting the region selected by the user as a mirroring region is mapped.

According to an embodiment, the electronic device 401 may receive a first input 413 of the user for selecting the second button 412. When the electronic device 401 receives the first input 413, the electronic device 401 may provide at least one region as a candidate for a region o be output on the external electronic device 402 or a mirroring region. According to an embodiment, the electronic device 401 may provide the candidate for the mirroring region by displaying a guide line along the periphery of the at least one region. For example, the electronic device 401 may display a guide line along the periphery of a first region 415 on which a video is output. According to an embodiment, the electronic device 401 may provide a screen aspect ratio (or, a width to height ratio) at which a screen corresponding to the at least one region is output on the external electronic device. For example, the electronic device 401 may display, in a corner of the first region 415, a first user interface (UI) 416 that provides information about a screen aspect ratio at which a screen corresponding to the first region 415 is output on the external electronic device 402. According to an embodiment, the electronic device 401 may determine the screen aspect ratio at which the screen corresponding to the first region 415 is output on the external electronic device, based on the ratio of the width to the height of the first region 415.

According to an embodiment, the electronic device 401 may receive a second input 414 of the user for selecting the first region 415. When the electronic device 401 receives the second input 414, the electronic device 401 may set the first region 415 as a mirroring region. For example, the electronic device 401 may set the first region 415 as a mirroring region that is mirrored on the main window of the external electronic device 402. According to an embodiment, when the electronic device 401 receives the second input 414, the electronic device 401 may display the second screen 420 on the display. According to another embodiment, when the electronic device 401 receives a user input for selecting the first button 411, the electronic device 401 may set the entire region of the first screen 410 as a mirroring region.

Referring to the second screen 420 of FIG. 4, the electronic device 401 may display, in the corner of the first region 415, a second UI 421 representing that the first region 415 is a main region output on the main window. According to an embodiment, the electronic device 401 may display a user interface that includes a third button 422 onto which an operation of modifying (or, resetting) the main region is mapped and a fourth button 423 onto which an operation of executing a focus mirroring function is mapped. According to an embodiment, the focus mirroring function may refer to a function of enlarging a specified region and outputting the enlarged region on the external electronic device. The specified region may include an object to be focused by the user. According to an embodiment, when the electronic device 401 receives an input for selecting the fourth button 423, the electronic device 401 may provide a user interface for specifying a region to perform focus mirroring. The user interface for specifying the region to perform the focus mirroring will be described below with reference to FIG. 6. According to an embodiment, when the electronic device 401 receives an input for selecting the third button 422, the electronic device 401 may display the first screen 410 again. For example, the electronic device 401 may display a guide line along the periphery of at least one region and may receive an input for selecting the main region from the user again.

According to an embodiment, when the electronic device 401 receives the second input 414 of the user for selecting the first region 415, the electronic device 401 may configure the screen corresponding to the first region 415 as a screen to be output on the external electronic device 402. The electronic device 401 may form the screen to be output on the external electronic device 402, based on information about the screen corresponding to the first region 415 and layout information for outputting the screen corresponding to the first region 415 on the external electronic device 402. For example, the layout information may include a screen aspect ratio (or, a width to height ratio) at which the screen corresponding to the first region 415 is output on the external electronic device 402. The screen aspect ratio may be the screen aspect ratio (e.g., 16:9) displayed through the first UI 416 on the first screen 410 by the electronic device 401. The above description given with reference to FIG. 3 may be applied to a method of forming, by the electronic device 401, the screen to be output on the external electronic device 402 according embodiment. According to an embodiment, the electronic device 401 may transmit, to the external electronic device 402, the screen formed to be output on the external electronic device 402. The external electronic device 402 may output the screen transmitted from the electronic device 401. The screen output by the external electronic device 402 may include a first window 451 on which the screen corresponding to the first region 415 is output. According to an embodiment, the first window 451 may be referred to as the main window.

Hereinafter, an operation of sharing a screen output on a focus window of a screen output on an external electronic device by an electronic device according to an embodiment will be described with reference to FIG. 5. Here, the focus window may refer to an output region other than a main window among output regions of a plurality of split screens when the screen output on the external electronic device includes the plurality of split screens.

Figure 5:
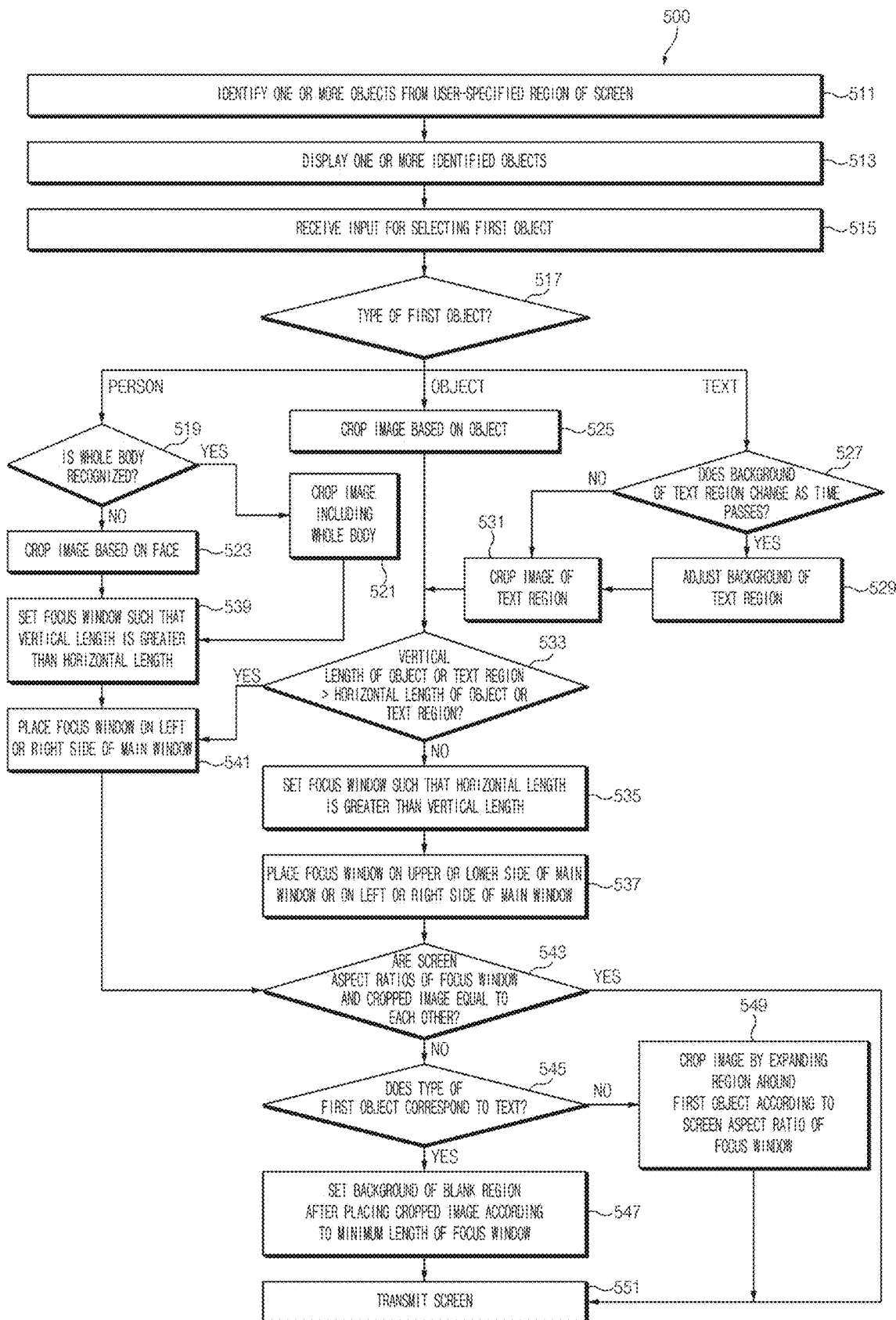
FIG. 5 is a flowchart illustrating art operation of an electronic device according to an embodiment.

FIG. 5 is a flowchart 500 illustrating an operation of the electronic device according to an embodiment. Operations of the electronic device that will be described below may be performed by the electronic device 101 of FIG. 1 or the processor 120 of the electronic device 101. According to an embodiment, the operations of the electronic device that will be described below may correspond to operations 205 and 207 of FIG. 2. According to an embodiment, the operations of the electronic device that will be described below may be performed after the operations illustrated in FIG. 3 are performed. Hereinafter, the external electronic device may be the target electronic device determined by operation 313 illustrated in FIG. 3.

In operation 511, the electronic device may identify one or more objects from a user-specified region of a screen. According to an embodiment, before performing operation 511 the electronic device may provide a user interface through which a user specifies a region. The electronic device may receive a user input (e.g., a drag input) for specifying the region. According to an embodiment, the user-specified region may include an object that the user desires to focus. According to an embodiment, based on object recognition, the electronic device may identify the one or more objects and the types of the objects from an image corresponding to the user-specified region of the screen displayed on a display (e.g., the display module 160 of FIG. 1). According to an embodiment, the types of the one or more objects may include at least one of a person, an object, or text.

In operation 513, the electronic device may display the one or more identified objects. According to an embodiment, the electronic device may crop (or, extract) images corresponding to regions including the one or more identified objects from an image corresponding to the entire region of the screen and may display the cropped (or, extracted) images on the display. According to an embodiment, the electronic device may divide the images of the objects into groups depending on the types of the objects. The electronic device may provide a guide that displays the images of the one or more identified objects and allows the user to select at least one image.

In operation 515, the electronic device may receive an input for selecting a first object. According to an embodiment, the electronic device may receive an input for selecting an image including the first object among the images of the one or more displayed objects. Hereinafter, a case in which the user selects one object will be described. However, when the user selects a plurality of objects, a method to be described below may be identically applied to a plurality of focus windows.

In operation 517, the electronic device may identify the type of the first object. According to an embodiment, the type of the first object may include a person, an object, or text. According to an embodiment, the electronic device may perform operation 519 when the type of the first object is a person, may perform operation 525 when the type of the first object is an object, and may perform operation 527 when the type of the first object is text.

In operation 519, the electronic de ice may determine whether the whole body of a person is recognized. According to an embodiment, when the type of the first object is a person, the electronic device pray determine whether the whole body of the first object is recognized on the screen displayed on the display. According to an embodiment, when the whole body of the first object is recognized on the screen (operation 519-YES), the electronic device may perform operation 521, and when the whole body of the first object is not recognized on the screen (operation 519-NO), the electronic device may perform operation 523. For example, when the body of the person is recognized by a specified percentage or more on the screen, the electronic device may determine that the whole body is recognized, and when the body of the person is not recognized by the specified percentage or more on the screen, the electronic device may determine that the whole body is not recognized.

In operation 521, the electronic device may crop an image including the whole body. According to an embodiment, the electronic device may crop an image corresponding to the first object and a region around the first object from the image corresponding to the entire region of the screen such that the whole body of the first object is included in the cropped image.

In operation 523, the electronic device may crop an image based on a face. According to an embodiment, based on the face of the first object, the electronic device may crop an image corresponding to the first object and the region around the first object from the image corresponding to the entire region of the screen.

In operation 525, the electronic device may crop an image based on an object. According to an embodiment, the electronic device may crop an image corresponding to the first object and the region around the first object from the image corresponding to the entire region of the screen.

In operation 527, the electronic device may determine whether the background of a text region changes as time passes. According to an embodiment, the text region may refer to a region where text is displayed on the screen output on the display of the electronic device. For example, the text region may include a comment window or a chatting window. According to an embodiment, the text region may be updated in real time. According to an embodiment, the text region may overlap a region, such as a video or a slide show, which changes as time passes. For example, the electronic device may display a comment window on a video such that the comment window overlaps the video. In this case, the electronic device may determine that the background of the text region changes as time passes. According to an embodiment, the electronic device may perform operation 529 when it is determined that the background of the text region changes as time passes (operation 527-YES) and may perform operation 531 when it is determined that the background of the text region does not change as time passes (operation 527-NO).

In operation 529, the electronic device may adjust the background of the text region. For example, the electronic device may blur the background of the text region, or may adjust the brightness of the background of the text region. According to an embodiment, the electronic device may adjust the background of the text region by processing the image corresponding to the screen output on the display. According to an embodiment, the electronic device may increase the discrimination/contrast of the text by adjusting the background of the text region. According to an embodiment, the electronic device may perform operation 531 after performing operation 529.

In operation 531, the electronic device may crop an image of the text region. According to an embodiment, the electronic device may crop an image corresponding to the text region from the image corresponding to the entire region of the screen.

According to an embodiment, when the type of the first object is a person, the electronic device may perform operations 539 and 541. According to an embodiment, when the type of the first object is an object or text, the electronic device may perform operations 533, 535, and 537, or may perform operations 533 and 541.

In operation 539, the electronic device may set the focus window such that the vertical length is greater than the horizontal length. According to an embodiment, the focus window may refer to a region where the image cropped to include the first object is output on the screen output on the external electronic device. According to an embodiment, when the type of the first object is a person, the electronic device may set the focus window such that the vertical length is greater than the horizontal length.

In operation 541, the electronic device may place the focus window on the left or right side of the main window. According to an embodiment, when the focus window has a screen aspect ratio in which a vertical length is greater than a horizontal length, the electronic device may place the focus window on the left or right side of the main window. According to an embodiment, the main window may refer to a region where the screen transmitted from the electronic device to the external electronic device depending on the operations illustrated in FIG. 3 is output.

According to an embodiment, the electronic device may adjust the size of the main window by additionally placing the focus window on one screen of the external electronic device. For example, the electronic device may decrease the size of the main window. According to an embodiment, the electronic device may adjust the size of the main window within a range in which the size of the main window is greater than or equal to the size of the focus window.

According to an embodiment, the sizes of the windows may refer to the areas occupied by the respective windows on the entire screen of the external electronic device. According to an embodiment, the electronic device may adjust the size of the main window, based on the number of windows. For example, when N windows are output on one screen of the external electronic device, the electronic device may adjust the size of the main window within a range of more than 1/N of the area of the entire screen of the external electronic device.

In operation 533, when the type of the first object n object or text, the electronic device may determine whether the vertical length of the object or the text region is greater than the horizontal length thereof. According to an embodiment, when it is determined that the vertical length of the first object is greater than the horizontal length of the first object (operation 533-YES), the electronic device may perform operation 541. According to an embodiment, when it is determined that the vertical length of the first object is greater than the horizontal length of the first object, the electronic device may set the focus window such that the vertical length is greater than the horizontal length. According to an embodiment, when it is determined that the horizontal length of the first object is greater than the vertical length of the first object (operation 533-NO), the electronic device may perform operation 535.

In operation 535, the electronic device may set the focus window such that the horizontal length is greater than the vertical length. According to an embodiment, when it is determined that the type of the first object is an object or text and the horizontal length of the first object is greater than the vertical length of the first object, the electronic device may set the focus window such that the horizontal length is greater than the vertical length.

In operation 537, the electronic device may place the focus window on the upper or lower side of the main window or on the left or right side of the main window. According to an embodiment, when the focus window has a screen aspect ratio in which a horizontal length is greater than a vertical length, the electronic device may place the focus window depending on the screen aspect ratio of the main window. When the focus window and the main window have a screen aspect ratio in which a horizontal length is greater than a vertical length, the electronic device may place the focus window on the upper or lower side of the main window. When the focus window has a screen aspect ratio in which a horizontal length is greater than a vertical length and the main window has a screen aspect ratio in which a vertical length is greater than a horizontal length, the electronic device may place the focus window on the left or right side of the main window.

According to an embodiment, the operation (e.g., operation 535 or 539) of setting (or, determining) the width to height ratio of the focus window by the electronic device according to an embodiment may correspond to the operation described above with reference to FIG. 2 in which the electronic device determines the width to height ratio of the second region. According to an embodiment, the operation (e.g., operation 537 or 541) of setting (or, determining) the position of the focus window relative to the main window by the electronic device according to an embodiment may correspond to the operation described above with reference to FIG. 2 in which the electronic device determines the position of the second screen relative to the first screen on the third screen.

According to an embodiment, the electronic device may perform operation 543 after performing the operation (e.g., operation 521, 523, 525, or 531) of cropping the image corresponding to the region including the first object and the operation (e.g., operation 535, 537, 539, or 541) of setting the screen aspect ratio of the focus window and the position of the focus window relative to the main window. Although the electronic device determines the position of the focus window relative to the main window after cropping the image in the above-described embodiment, the electronic device may crop the image after determining the position of the focus window relative to the main window.

In operation 543, the electronic device may determine whether the focus window and the cropped image have the same screen aspect ratio. According to an embodiment, the electronic device may determine whether the width to height ratio of the cropped image is equal to the width to height ratio of the focus window. According to an embodiment, when it is determined that the cropped image and the focus window have the same screen aspect ratio (operation 543-YES), the electronic device may perform operation 551.

According to an embodiment, when it is determined that the screen aspect ratio of the cropped image is not equal to the screen aspect ratio of the focus window (operation 543-NO), the electronic device may perform operation 545. In operation 545, the electronic device may determine whether the first object is text. According to an embodiment, the electronic device may store information about the type of the first object that is determined in operation 517. According to an embodiment, operation 545 may be an operation of identifying, by the electronic device, the stored information about the type of the first object.

According to an embodiment, when the type of the first object is text (operation 545-YES), the electronic device may perform operation 547. In operation 547, the electronic device may set the background of a blank region of the focus window after placing the cropped image according to a minimum length of the focus window. For example, the electronic device may place the cropped image according to a smaller one of the horizontal length and the vertical length of the focus window. For example, the electronic device may place the cropped image and may set the background of the blank region as an image having a specified color or a blurred image.

According to an embodiment, when the type of the first object is not text (operation 545-NO), the electronic device may perform operation 549. For example, the type of the first object may be a person or an object. In operation 549, the electronic device may crop an image by expanding the region around the first object according to the screen aspect ratio of the focus window. According to an embodiment, the electronic device may re-crop an image of the first object and the region around the first object such that the image has the same width to height ratio as the focus window.

According to an embodiment, the electronic device may perform operation 551 after performing operation 547 or 549.

In operation 551, the electronic device may transmit a screen. According to an embodiment, the electronic device may transmit one screen including the main window and the focus window to the external electronic device. According to an embodiment, a screen corresponding to the output region determined by the electronic device in operation 315 or 317 of FIG. 3 may be output on the main window, and a screen corresponding to the image crop region determined by the electronic device in operation 521, 523, 525, 531, or 549 may be output on the focus window.

Hereinafter, a user interface displayed by an electronic device to share a screen output on a focus window of a screen output on an external electronic device according to an embodiment will be described with reference to FIG. 6.

Figure 6:
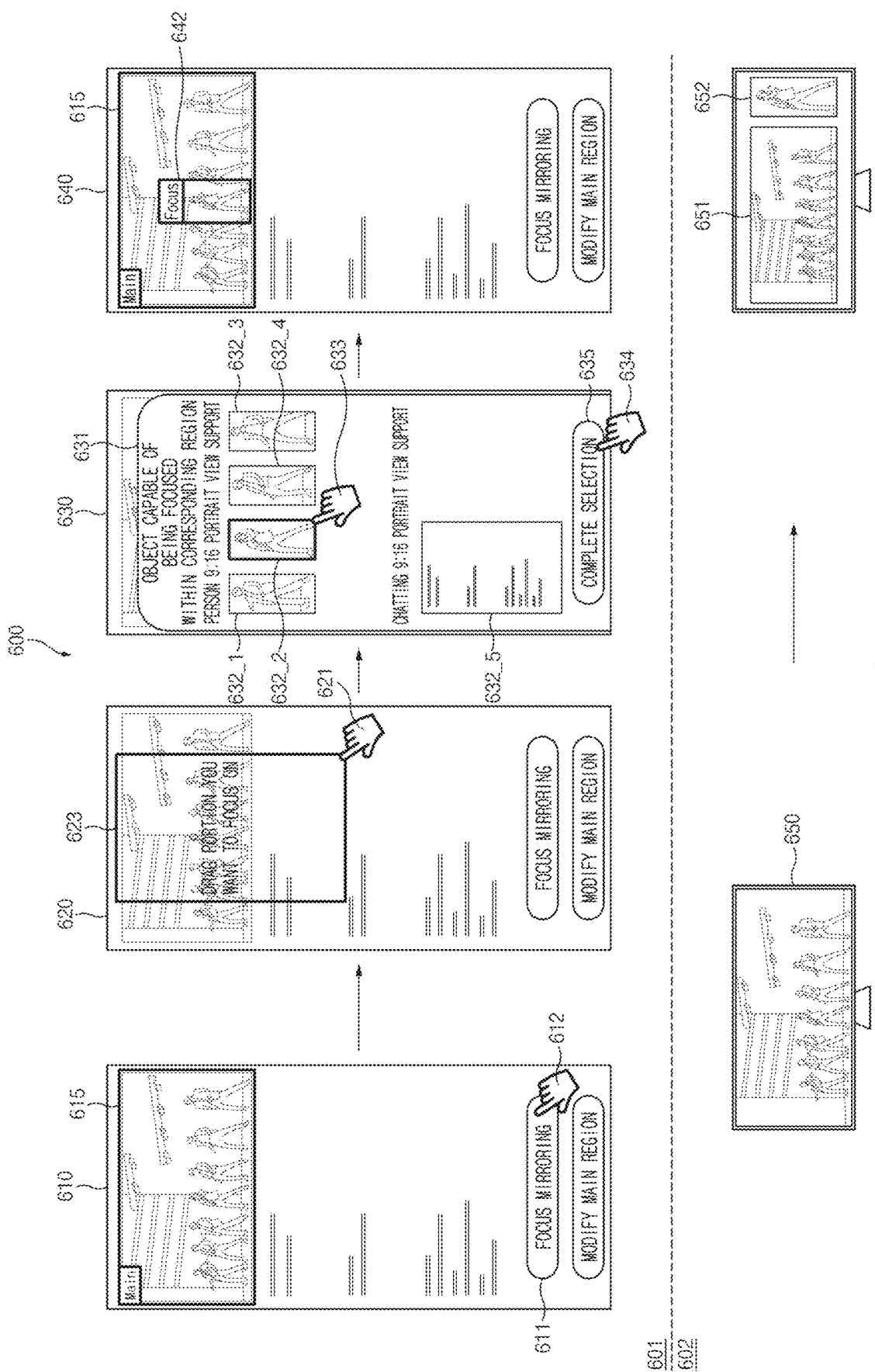
FIG. 6 is a view illustrating a user interface provided by an electronic device according to an embodiment.

FIG. 6 is a view 600 illustrating the user interface provided by the electronic device according to an embodiment. Operations of the electronic device 601 (e.g., the electronic device 101 of FIG. 1) that will be described below may be performed by a processor (e.g., the processor 120 of FIG. 1) of the electronic device 601. According to an embodiment, a first screen 610, a second screen 620, a third screen 630, and a fourth screen 640 may be screens displayed on a display (e.g., the display module 160 of FIG. 1) by the electronic device 601.

According to an embodiment, the first screen 610 of FIG. 6 may be the same screen as the second screen 420 of FIG. 4. Referring to the first screen 610 of FIG. 6, the electronic device 601 may be in a state in which a first region 615 is set as a region output on a first window 650 of the external electronic device 602. According to an embodiment, the first window 650 may be referred to as a main window. According to an embodiment, the first region 615 may be a main region output on the main window.

Referring to the first screen 610, the electronic device 601 may display a user interface including a first button 611 onto which an operation of executing a focus mirroring function is mapped. According to an embodiment, the focus mirroring function may refer to a function of enlarging a specified region and outputting the enlarged region on the external electronic device. The specified region may include an object to be focused by a user. According to an embodiment, when the electronic device 601 receives a first input 612 of the user for selecting the first button 611, the electronic device 601 may provide a user interface for specifying a region to perform focus mirroring. According to an embodiment, when the electronic device 601 receives the first input 612, the electronic device 601 may display the second screen 620 on the display. According to an embodiment, when the electronic device 601 receives the first input 612, the electronic device 601 may temporarily stop the output of an image being played. In this case, the electronic device 601 may continue to output the image on the first window 650 of the external electronic device 602.

Referring to the second screen 620 of FIG. 6, the electronic device 601 may provide a user interface for specifying a region. For example, the user may arbitrarily drag a region including an object to be focused. According to an embodiment, when the electronic device 601 receives a second input 621 of the user for specifying a region by a drag operation, the electronic device 601 may identify one or more objects from the specified region. According to an embodiment, when the electronic device 601 receives the second input 621, the electronic device 601 may display the third screen 630 on the display.

Referring to the third screen 630 of FIG. 6, the electronic device 601 may display images corresponding to regions including the one or more identified objects. For example, the electronic device 601 may display a first image 632_1 corresponding to a first object, a second image 632_2 corresponding to a second object, a third image 632_3 corresponding to a third object, a fourth image 632_4 corresponding to a fourth object, and a fifth image 632_5 corresponding to a fifth object. According to an embodiment, the electronic device 601 may divide the one or more identified objects into groups depending on the types of the objects and may display the images corresponding to the respective objects. For example, the types of the first object, the second object, the third object, and the fourth object may be people, and the type of the fifth object may be text. In this case, the electronic device 601 may display the first image 632_1, the second image 632_2, the third image 632_3, the fourth image 632_4, and the fifth image 632_5 as separate things. According to an embodiment, the electronic device 601 may determine a screen aspect ratio (or, a width to height ratio) at which a screen corresponding to the region including each of the one or more identified objects is output on the external electronic device 602 and may display the screen together.

According to an embodiment, the electronic device 601 may receive an input for selecting at least one object among the one or more identified objects. According to an embodiment, the electronic device 601 may receive an input for selecting at least one image among the images corresponding to the regions including the one or more identified objects. For example, the electronic device 601 may receive a third input 633 for selecting the second image 632_2 among the first image 632_1, the second image 632_2, the third image 632_3, the fourth image 632_4, and the fifth image 632_5.

According to an embodiment, after receiving the third input 633 the electronic device 601 may receive a fourth input 634 of the user for selecting a second button 635. According to an embodiment, when the electronic device receives the fourth input 634, the electronic device may set a second region 642 including the second object selected based on the third input 633 as a region on which focus mirroring is to be performed. According to an embodiment, the second region 642 may be referred to as a focus region. According to an embodiment, when the electronic device receives the fourth input 634, the electronic device may end the display of the user interface for specifying a region on which focus mirroring is to be performed. According to an embodiment, when the electronic device receives the fourth input 634, the electronic device may display the fourth screen 640.

Referring to the fourth screen 640 of FIG. 6, the electronic device 601 may display guide lines along the peripheries of the first region 615 and the second region 642 to allow the user to recognize that the first region 615 and the second region 642 are mirrored. According to an embodiment, the electronic device 601 may provide a display UI representing whether each of the first region 615 and the second region 642 is a main region output on the main window of the external electronic device 602 or a focus region output on the focus window of the external electronic device 602.

According to an embodiment, when the electronic device 601 receives the third input 633 for selecting the second image 632_2 and receives the fourth input 634, the electronic device 601 may determine the second region 642 including the second object. According to an embodiment, when the electronic device 601 receives the third input 633 and the fourth input 634, the electronic device 601 may firm a third screen on which a first screen corresponding to the first region 615 and a second screen corresponding to the second region 642 are output as one screen on the external electronic device 602. The electronic device 601 may for the third screen to be output on the external electronic device 602, based on information about the first screen corresponding to the first region 615, information about the second screen corresponding to the second region 642, and layout information for outputting the first screen corresponding to the first region 615 and the second screen corresponding to the second region 642 as one screen on the external electronic device 602. The layout information may include at least one of the screen aspect ratio (or, the width to height ratio), the size, or the position of the screen on which each of the first screen corresponding to the first region 615 and the second screen corresponding to the second region 642 is output in the external electronic device 602. According to an embodiment, the layout information may include the position of the second screen relative to the first screen on the third screen. The above description given with reference to FIGS. 2 and 5 may be applied to a method of forming, by the electronic device 601, the third screen by combining the first screen corresponding to the first region 615 and the second screen corresponding to the second region 642 according to an embodiment. According to an embodiment, the electronic device 601 may transmit. to the external electronic device 602, the third screen formed to be output on the external electronic device 602. The external electronic device 602 may output the third screen transmitted from the electronic device 601. The third screen output by the external electronic device 602 may include a first window 651 on which the first screen corresponding to the first region 615 is output and a second window 652 on which the second screen corresponding to the second region 642 is output. According to an embodiment, the first window 651 may be referred to as the main window, and the second window 652 may be referred to as the focus window. The screen aspect ratio, size, and position of the screen on which the first screen corresponding to the first region 615 is output on the external electronic device 602 according to the layout information may correspond to the screen aspect ratio, size, and position of the first window 651. The screen aspect ratio, size, and position of the screen on which the screen corresponding to the second region 642 is output on the external electronic device 602 according to the layout information may correspond to the screen aspect ratio, size, and position of the second window 652.

Hereinafter, operations of determining layouts of screens output on external electronic devices by electronic devices according to embodiments will be described with reference to FIGS. 7 to 9. The operations of the electronic devices that will be described with reference to FIGS. 7 to 9 may be performed by the electronic device 101 of FIG. 1 or the processor 120 of the electronic device 101.

Figure 7:
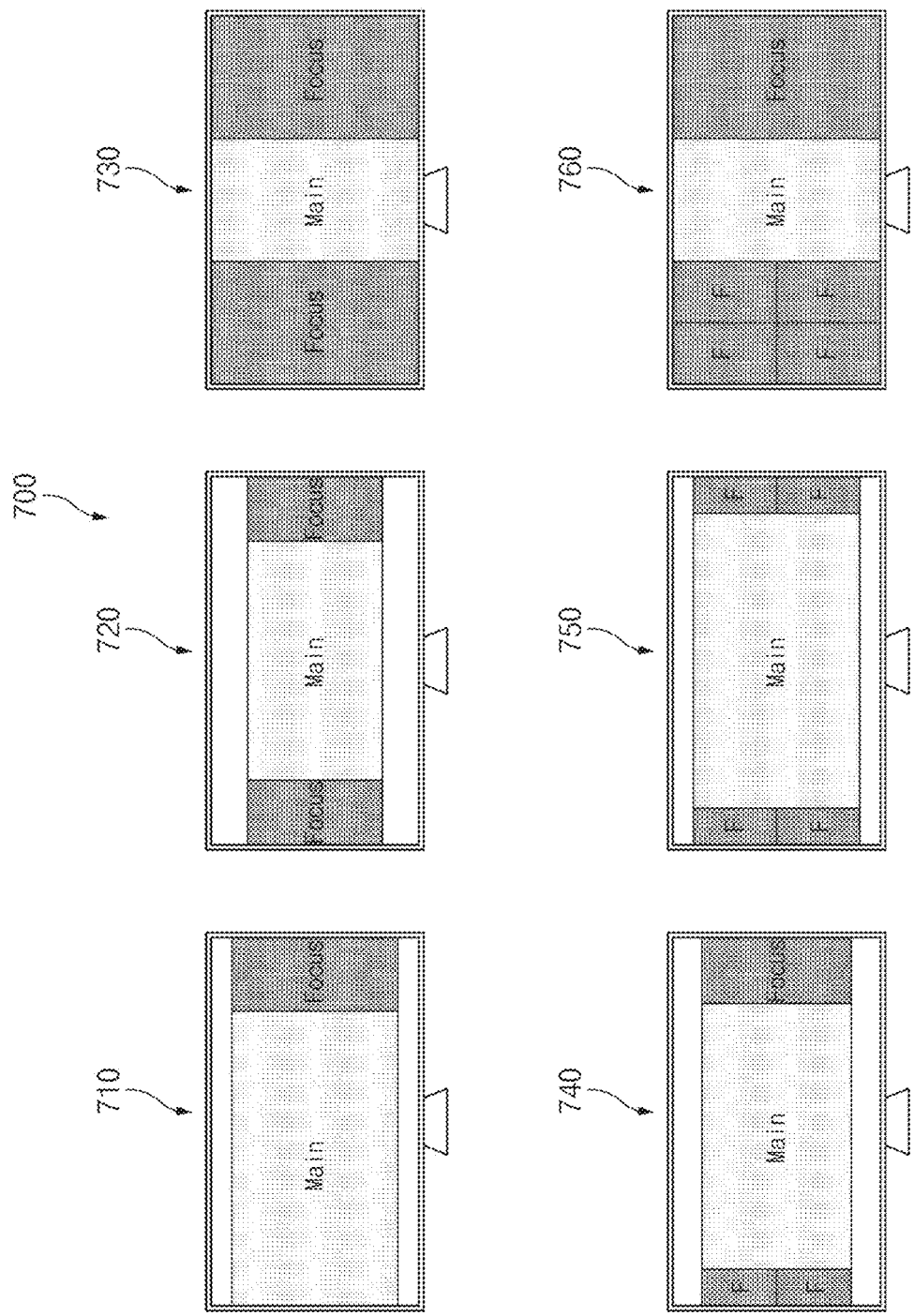
FIG. 7 is a view illustrating examples of a layout of a screen output by an external electronic device according to an embodiment.

FIG. 7 is a view 700 illustrating examples of a layout of a screen output by an external electronic device according to an embodiment. FIG. 7 illustrates examples of determining the layout of the screen output on the external electronic device when an electronic device according to an embodiment determines the screen aspect ratio of a focus window as a screen aspect ratio in which a vertical length is greater than a horizontal length.

Referring to a first layout 710, a second layout 720, a third layout 730, a fourth layout 740, a fifth layout 750, and a sixth layout 760 of FIG. 7, when the electronic device determines the screen aspect ratio of the focus window as the screen aspect ratio in which the vertical length is greater than the horizontal length, the electronic device may determine the layout such that the focus window is disposed on the left or right side of the main window.

Referring to the second layout 720, the third layout 730, the fourth layout 740, the fifth layout 750, and the sixth layout 760 of FIG. 7, when a plurality of focus windows are provided, the electronic device may determine the layout such that the plurality of focus windows are disposed on at least one of the left side or the right side of the main window. According to an embodiment, when two err more focus windows are provided, the electronic device may determine the layout such that the main window is located in the center of the screen and one or more focus windows are disposed on the left and right sides of the main window.

Referring the first layout 710, the second layout 720, and the third layout 730 of FIG. 7, the electronic device may adjust the sizes of the focus windows such that the heights (or, the vertical lengths) of the focus windows are equal to the height (or, the vertical length) of the main window.

Referring to the fourth layout 740, the fifth layout 750, and the sixth layout 760 of FIG. 7, when two or more focus windows are vertically disposed on the left or right side of the main window, the electronic device may adjust the sizes of the focus windows such that the sum of the heights of the focus windows is equal to the height of the main window.

According to an embodiment, the electronic device may determine the layout such that the main window is maintained at a specified size or larger and the remaining region of the screen is divided into regions in which the focus windows are disposed. Here, the size pray mean the occupied area on the screen output on the external electronic device. For example, the electronic device may determine the layout such that the size of the main window is greater than or equal to the sizes of the focus windows. In another example, when the number of windows including the main window and the focus windows is N, the electronic device may maintain the size of the main window such that the area of the main window is greater than or equal to 1/N of the area of the screen output on the external electronic device. According to an embodiment, as the number of focus windows is increased, the electronic device may decrease the size of at least one of the main window or the focus windows.

According to an embodiment, as the electronic device maintains the size of the main window at the specified size or larger, the electronic device may secure the visibility of contents provided through the main window.

Figure 8:
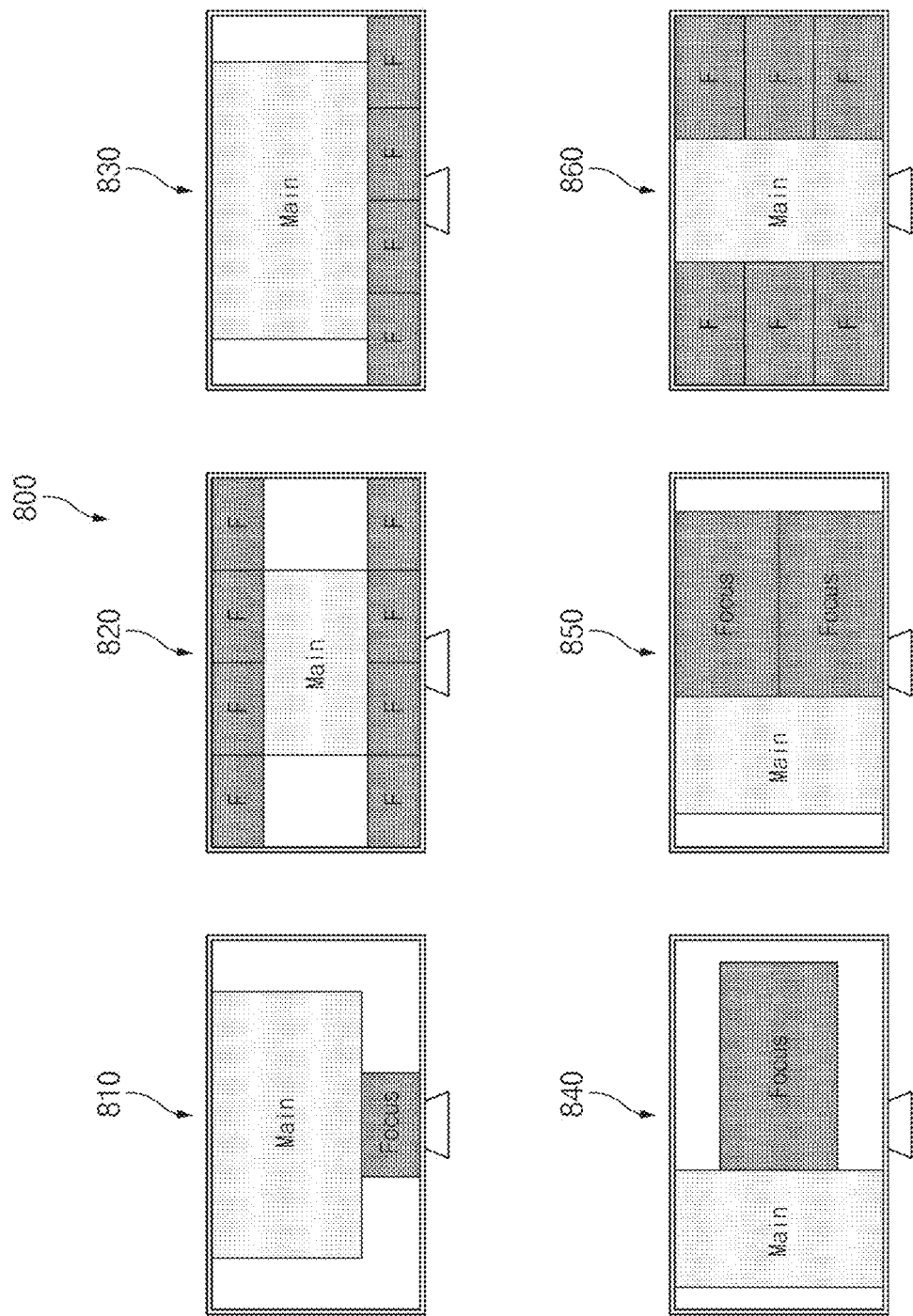
FIG. 8 is a view illustrating examples of a layout of a screen output by an external electronic device according to an embodiment.

FIG. 8 is a view 800 illustrating examples of a layout of a screen output by an external electronic device according to an embodiment. FIG. 8 illustrates examples of determining the layout of the screen output on the external electronic device when an electronic device according to an embodiment determines the screen aspect ratio of a focus window as a screen aspect ratio in which a horizontal length is greater than a vertical length.

According to an embodiment, when the electronic device determines the screen aspect ratio of the focus window as the screen aspect ratio in which the horizontal length is greater than the vertical length, the electronic device may determine whether the focus window is disposed on the upper or lower side of the main window or on the left or right side of the main window depending on the screen aspect ratio of the main window.

Referring to a first layout 810, a second layout 820, and a third layout 830 of FIG. 8, when the electronic device determines the screen aspect ratios of the main window and the focus window as screen aspect ratios in which a horizontal length is greater than a vertical length, the electronic device may determine the layout such that focus window is disposed on the upper or lower side of the main window depending on the screen aspect ratio of the main window. According to an embodiment, when the focus window is disposed on the upper or lower side of the main window, the electronic device may determine the layout such that the centers of the focus window and the main window are aligned with each other.

Referring to a fourth layout 840, a fifth layout 850, and a sixth layout 860 of FIG. 8, when the electronic device determines the screen aspect ratios of the main window as a screen aspect ratio in which vertical length is greater than a horizontal length and determines the screen aspect ratio of the focus window as a screen aspect ratio in which a horizontal length is greater than a vertical length, the electronic device may determine the layout such that the focus window is disposed on the left or right side of the main window depending on the screen aspect ratio of the main window.

Referring to the second layout 820 and the third layout 830 of FIG. 8, when a plurality of focus windows are disposed on at least one of the upper side or the lower side of the main window, the electronic device may determine the layout such that the plurality of focus windows are arranged in a left/right direction.

Referring to the fifth layout 850 and the sixth layout 860 of FIG. 8, when a plurality of focus windows are disposed on at least one of the left side or the right side of the main window, the electronic device may determine the layout such that the plurality of focus windows are arranged in an up/down direction.

Figure 9:
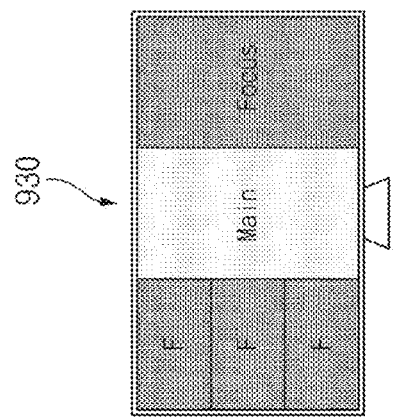
FIG. 9 is a view illustrating examples of a layout of a screen output by an external electronic device according to an embodiment.
Figure 9:
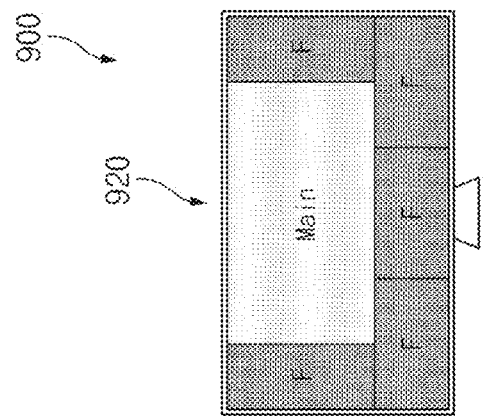
Figure 9:
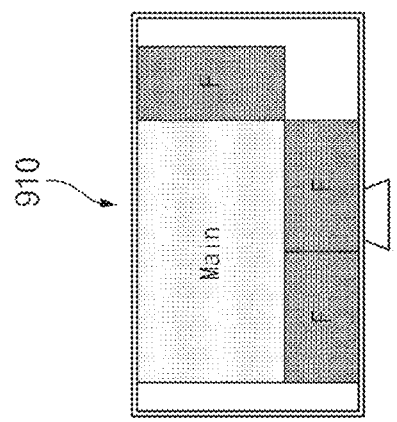

FIG. 9 is a view 900 illustrating examples of a layout of a screen output by an external electronic device according to an embodiment. FIG. 9 illustrates examples of determining the layout of the screen output on the external electronic device when a focus window having a screen aspect ratio in which a vertical length is greater than a horizontal length and a focus window having a screen aspect ratio in which a horizontal length is greater than a vertical length are mixed and disposed by an electronic device according to an embodiment.

Referring to a first layout 910, a second layout 920, and a third layout 930 of FIG. 9, the electronic device may determine the layout sing the layout determination methods described with reference to FIGS. 7 and 8 within the range in which the layout determination methods do not contradict each other.

Hereinafter, an operation of determining a layout of a screen output on an external electronic device based on a type of object by an electronic device according to an embodiment will be described with reference to FIG. 10.

Figure 10:
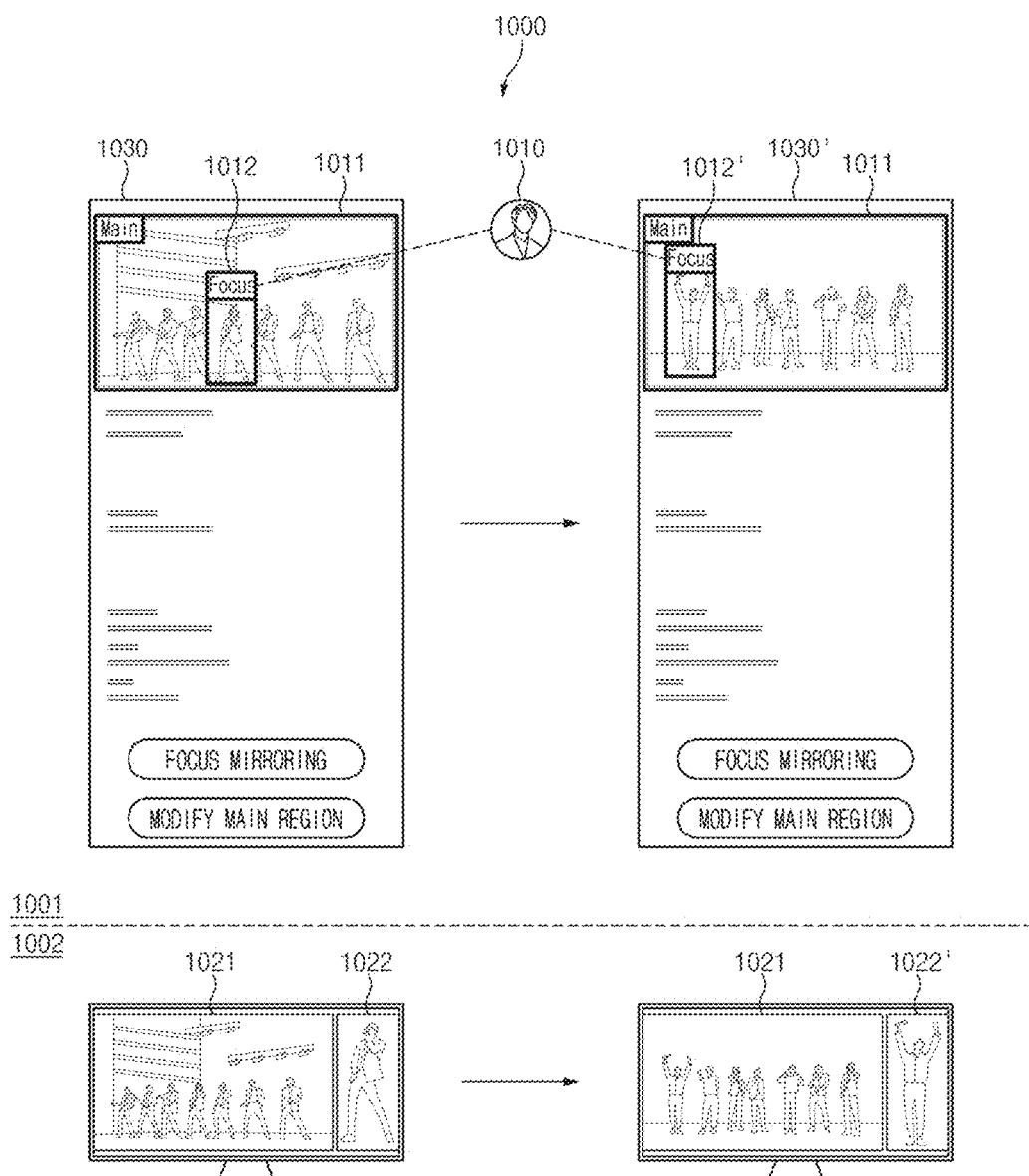
FIG. 10 is a view for explaining an operation of an electronic device according to an embodiment.

FIG. 10 is a view 1000 for explaining an operation of the electronic device according to an embodiment. Operations of the electronic device 1001 (e.g., the electronic device 101 of FIG. 1) that will be described below may be performed by a processor (e.g., the processor 120 of FIG. 1) of the electronic device 1001. According to an embodiment, a screen 1030 or 1030' may be a screen displayed on a display (e.g., the display module 160 of FIG. 1) by the electronic device 1001.

Referring to FIG. 10, the electronic device 1001 may determine to output a first screen corresponding to a first region 1011 on a first window 1021 of the screen output on the external electronic device 1002. According to an embodiment, when the electronic device 1001 receives a user input for selecting a first object 1010, the electronic device 1001 may determine to output a second screen corresponding to a second region 1012 including the first object 1010 on a second window 1022 of the screen output on the external electronic device 1002.

According to an embodiment, when the electronic device 1001 determines that the type of the first object 1010 is a person, the electronic device 1001 may determine the screen aspect ratio at which the second screen corresponding to the second region 1012 is output on the external electronic device or the screen aspect ratio of the second window 1022 as a ratio in which a vertical length is greater than a horizontal length.

According to an embodiment, when the electronic device 1001 determines that the type of the first object 1010 is a person, the electronic device 1001 may recognize the face of the first object 1010, and even though the screen 1030 output on the display of the electronic device 1001 is changed to another screen, the electronic device 1001 may recognize and track the first object 1010 on the changed screen 1030', based on the recognized face. According to an embodiment, the clothes or position of the first object 1010 may be changed on the changed screen 1030'. According to an embodiment, the electronic device 1001 may determine a changed second region 1012' including the first object 1010 on the changed screen 1030'. According to an embodiment, the electronic device 1001 may determine to output a screen corresponding to the changed second region 1012' on the second window 1022 of the external electronic device 1002.

Hereinafter, an operation of determining a screen output on a focus window of an external electronic device by an electronic device according to an embodiment will be described with reference to FIG. 11.

Figure 11:
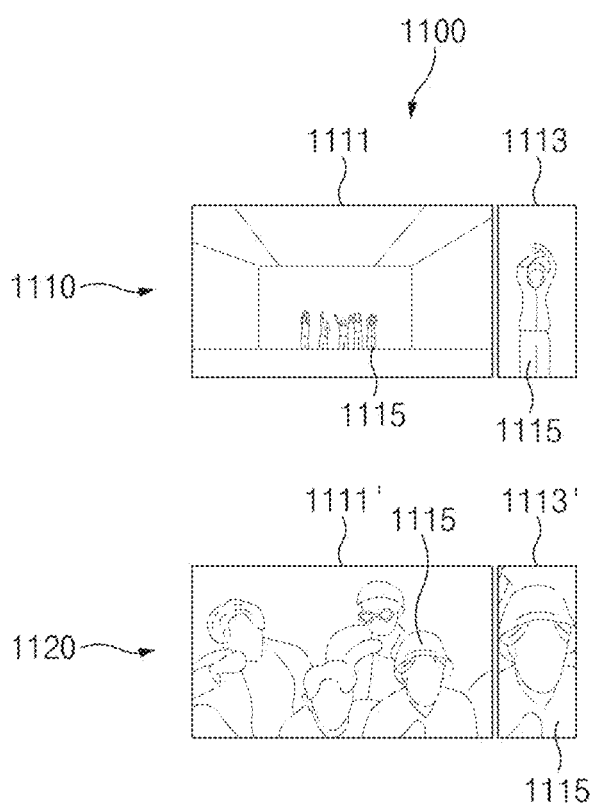
FIG. 11 is a view for explaining an operation of an electronic device according to an embodiment.

FIG. 11 is a view 1100 for explaining an operation of the electronic device according to an embodiment. Operations of the electronic device that will be described below may be performed by the electronic device 101 of FIG. 1 or the processor 120 of the electronic device 101.

According to an embodiment, a first drawing 1110 and a second drawing 1120 may represent screens that the electronic device desires to share with the external electronic device. The electronic device may configure the screens illustrated in the first drawing 1110 or the second drawing 1120 as one screen and may transmit the screen to the external electronic device. The external electronic device may output the screen transmitted from the electronic device. According to an embodiment, the screen transmitted to the external electronic device by the electronic device may include a main window and a focus window.

Referring to the first drawing 1110, the screen transmitted to the external electronic device by the electronic device may include a first screen 1111 and a second screen 1113. According to an embodiment, the first screen 1111 may be a screen corresponding to a first region on a screen output on a display of the electronic device, and the second screen 1113 may be a screen corresponding to a second region on the screen. According to an embodiment, the first region and the second region may at least partially overlap each other. For example, the second region may be a region including a first object 1115 included in the first region. According to an embodiment, the second screen 1113 may be a screen obtained by enlarging the second region including the first object 1115. According to an embodiment, the electronic device may determine to output the first screen 1111 on the main window of the screen output on the external electronic device.

According to an embodiment, the electronic device may determine that the type of the first object 1115 is a person. The electronic device may determine whether the whole body of the first object 1115 is recognized on the screen output on the display of the electronic device. For example, the electronic device may determine whether the whole body of the first object 1115 is recognized, based on whether the body of the first object 1115 is recognized by a specified percentage or more. When the electronic device determines that the body of the first object 1115 is recognized by the specified percentage or more on the screen output on the display of the electronic device, the electronic device may determine the second region such that the whole body of the first object 1115 is included therein. Accordingly, the electronic device may determine to output the second screen 1113 including the whole body of the first object 1115 on the focus window of the screen output on the external electronic device.

Referring to the second drawing 1120, the screen transmitted to the external electronic device by the electronic device may include a changed first screen 1111' and a changed second screen 1113'. For example, the first region play correspond to a video playback region. The first object 1115 may be an object recognized in a video. According to an embodiment, when the electronic device plays the video, at least one of the position, size, or form of the first object 1115 on the screen output on the display of the electronic device may be changed. According to an embodiment, the electronic device may determine to output the changed first screen 1111' on the main window of the screen output on the external electronic device.

According to an embodiment, when the position of the first object 1115 is changed, the electronic device may determine the second region corresponding to the changed position of the first object 1115. The electronic device may determine to output the changed second screen 1113' corresponding to the re-determined second region on the focus window of the screen output on the external electronic device.

According to an embodiment, the electronic device may adjust the degree to which the second region is enlarged, based on the size of the first object 1115.

According to an embodiment, when the form of the first object 1115 is changed, the electronic device may determine that the whole body of the first object 1115 is not recognized on the screen output on the display of the electronic device. When the electronic device determines that the body of the first object 1115 is not recognized by the specified percentage or more, the electronic device may determine the second region such that the face of the first object 1115 is included therein. According to an embodiment, the electronic device may determine the second region such that the face of the first object 1115 is located in the center of the second region.

Hereinafter, an operation of tracking an object and determining a screen output on a focus window of an external electronic device by an electronic device according to an embodiment will be described with reference to FIG. 12.

Figure 12:
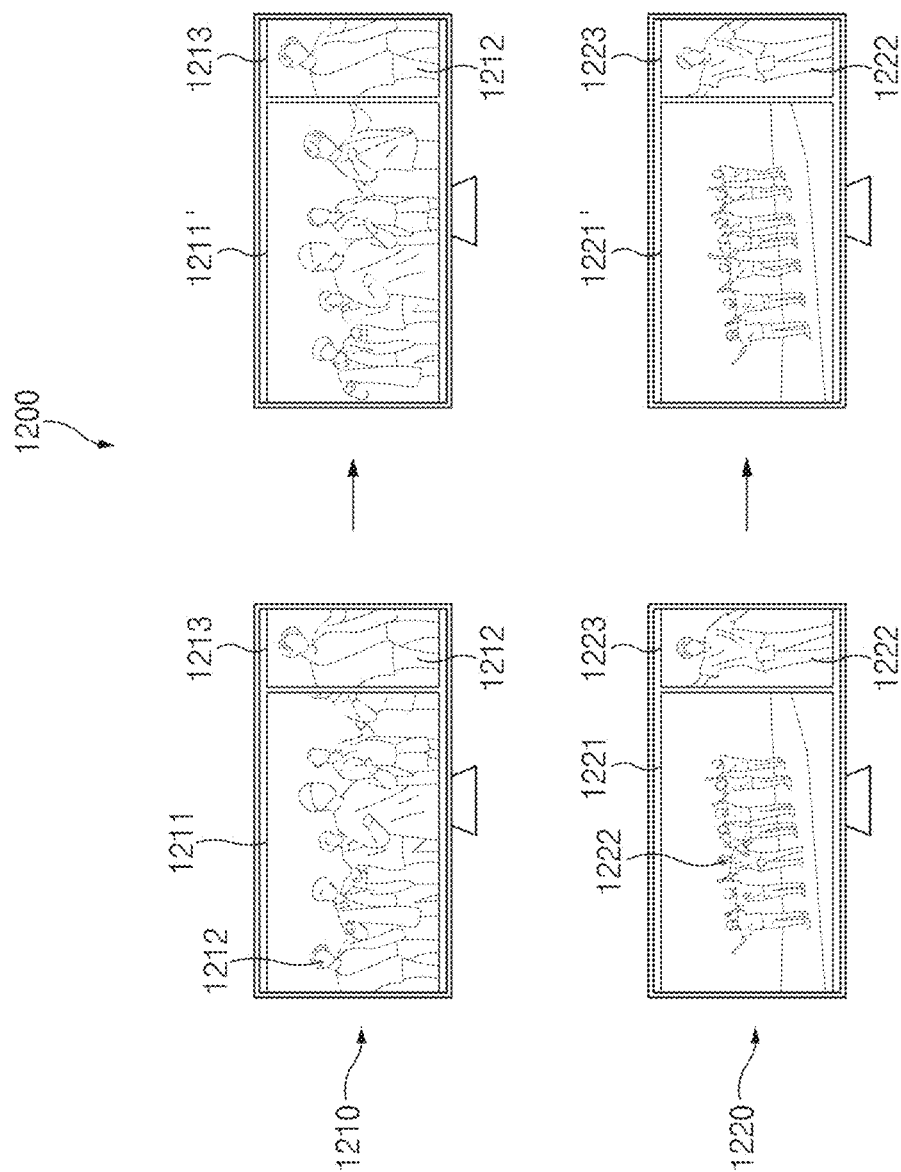
FIG. 12 is a view for explaining an operation of an electronic device according to an embodiment.

FIG. 12 is a view 1200 for explaining an operation of the electronic device according to an embodiment. Operations of the electronic device that will be described below may be performed by the electronic device 101 of FIG. 1 or the processor 120 of the electronic device 101.

According to an embodiment, a first drawing 1210 and a second drawing 1220 may represent a state in which the external electronic device outputs a screen transmitted from that the electronic device.

Referring to the first drawing 1210, the screen transmitted to the external electronic device by the electronic device may include a first screen 1211 and a second screen 1213. According to an embodiment, the first screen 1211 may be a screen corresponding to a first region on a screen output on a display of the electronic device, and the second screen 1213 may be a screen corresponding to a second region on the screen. According to an embodiment, the first region and the second region may at least partially overlap each other. For example, the second region may be a region including a first object 1212 included in the first region. According to an embodiment, the second screen 1213 may be a screen obtained by enlarging the second region including the first object 1212.

For example, the first region may correspond to a video playback region. The first object 1212 may be an object recognized in a video. According to an embodiment when the electronic device plays a frame not including the first object 1212 of the video, the electronic device may determine that the first object 1212 is not recognized on the screen output on the display of the electronic device. According to an embodiment, the electronic device may determine to output a changed first screen 1211' corresponding to a video frame changed according to the playback of the video on a main window of a screen output on the external electronic device. The changed first screen 1211' may not include the first object 1212. According to an embodiment, when the position of the first object 1212 is not recognized on the screen output on the display of the electronic device, the electronic device is not able to determine the second region including the first object 1212. According to an embodiment, the electronic device may determine to continue to output the most recently output second screen 1213 on the focus window of the screen output on the external electronic device. The electronic device may continue to output the most recently output second screen 1213 on the focus window of the screen output on the external electronic device until the position of the first object 1212 is re-recognized on the screen output on the display of the electronic device. The second screen 1213 may be a screen corresponding to the second region including the first object 1212, the position of which was most recently recognized prior to the time point when the position of the first object 1212 is not recognized on the screen output on the display of the electronic device.

Referring to the second drawing 1220, the screen transmitted to the external electronic device by the electronic device may include a first screen 1221 and a second screen 1223. The first screen 1221 and the second screen 1223 in the second drawing 1220 may correspond to the first screen 1211 and the second screen 1213 in the first drawing 1210, respectively. A first object 1222 in the second drawing 1220 may correspond to the first object 1212 in the first drawing 1210.

According to an embodiment, when it is determined that the type of the first object 1222 a person, the electronic device may recognize the face of the first object 1222 and may recognize and track the position of the first object 1222 on the screen output on the display of the electronic device, based on the recognized face of the first object 1222. According to an embodiment, when the first object 1222 is included in the screen but the face of the first object 1222 is not recognized, the electronic device may determine that the position of the first object 1222 is not recognized on the screen.

According to an embodiment, when the electronic device plays a frame in which the first object 1222 of the video is looking back, the electronic device may determine that the position of the first object 1222 is not recognized on the screen output on the display of the electronic device. According to an embodiment, the electronic device may determine to output a changed first screen 1211' corresponding to a video frame changed according to the playback of the video on the external electronic device. The changed first screen 1221' may include the back of the first object 1222. According to an embodiment, when the position of the first object 1222 is not recognized on the screen output on the display of the electronic device, the electronic device is not able to determine the second region including the first object 1222. According to an embodiment, the electronic device may determine to continue to output the most recently output second screen 1223 on the focus window of the screen output on the external electronic device. For example, the electronic device may continue to output the second screen 1223 most recently output on the external electronic device until the face of the first object 1222 is recognized again on the screen output on the display of the electronic device. The second screen 1223 may be a screen corresponding to the second region including the first object 1222, the face of which is most recently recognized price to the time point when the position of the first object 1222 is not recognized on the screen output on the display of the electronic device.

Hereinafter, operations of determining layouts of screens output on external electronic devices based on types of objects by electronic devices according to embodiments will be described with reference to FIGS. 13 and 14.

Figure 13:
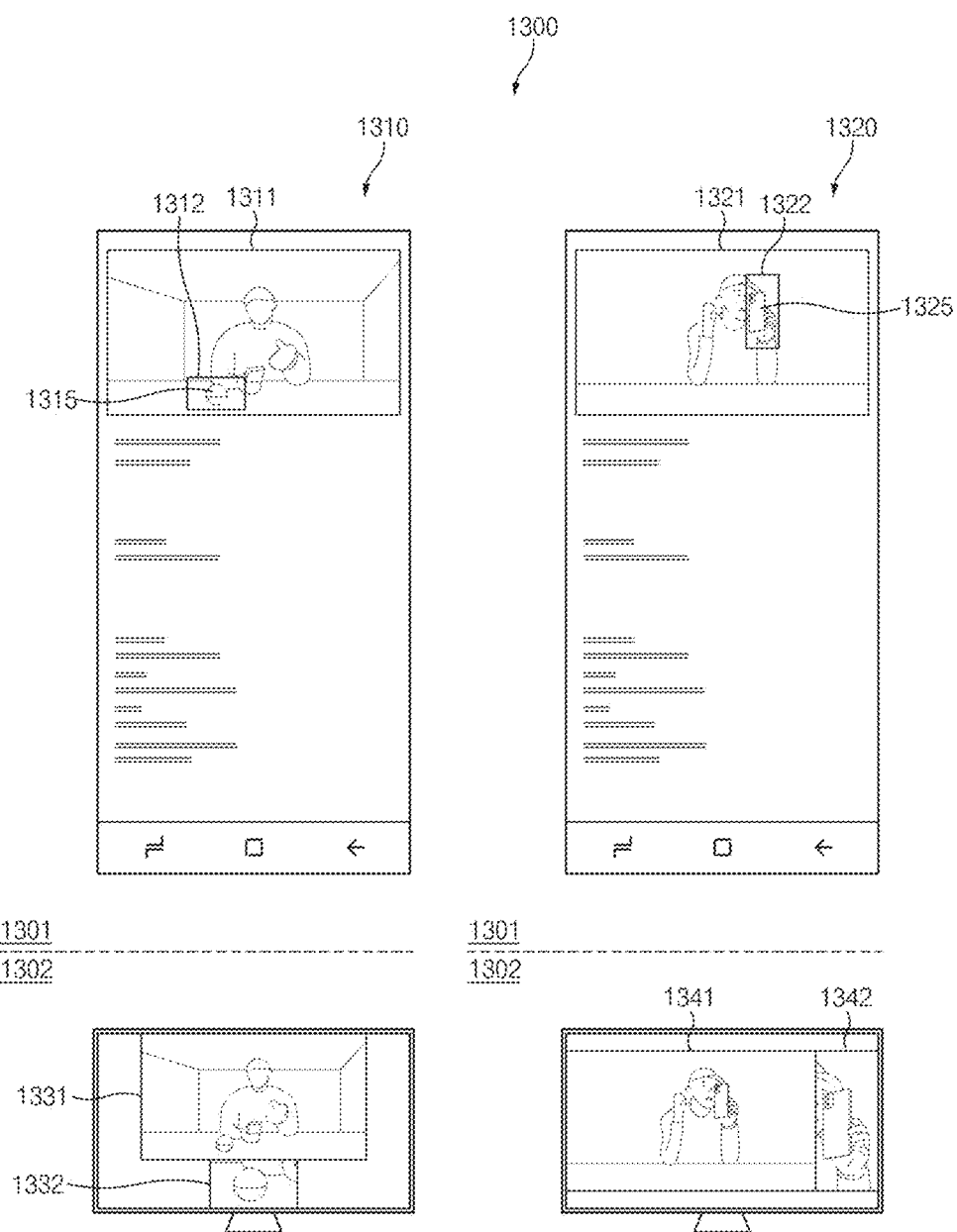
FIG. 13 is a view for explaining an operation of an electronic device according to an embodiment.

FIG. 13 is a view 1300 for explaining an operation of an electronic device according to an embodiment. Operations of the electronic device 1301 (e.g., the electronic device 101 of FIG. 1) that will be described below may be performed by a processor (e.g., the processor 120 of FIG. 1) of the electronic device 1301. According to an embodiment, a screen 1310 or 1320 may be a screen displayed on a display (e.g., the display module 160 of FIG. 1) by the electronic device 1301.

Referring to FIG. 13, the electronic device 1301 may determine to output, on a first window 1331 of an external electronic device 1302, a first screen corresponding to a first region 1311 on the screen 1310. According to an embodiment, when the electronic device 1301 receives a user input for selecting a first object 1315, the electronic device 1301 may determine to output, on a second window 1332, a second screen corresponding to a second region 1312 including the first object 1315 on the screen 1310.

According to an embodiment, when the electronic device 1301 determines that the type of the first object 1315 is an object, the electronic device 1301 may determine the screen aspect ratio at which the second screen corresponding to the second region 1312 is output on the external electronic device 1302 or the screen aspect ratio of the second window 1332, based on the width to height ratio of the first object 1315. When the electronic device 1301 determines that the horizontal length of the first object 1315 is greater than the vertical length of the first object 1315, the electronic device 1301 may determine the screen aspect ratio at which the second screen corresponding to the second region 1312 is output on the external electronic device 1302 or the screen aspect ratio of the second window 1332 as a ratio in which a horizontal length is greater than a vertical length.

According to an embodiment, when the electronic device 1301 determines the screen aspect ratio of the second window 1332 as the ratio in which the horizontal length is greater than the vertical length, the electronic device 1301 may determine the layout of the second window 1332 and the first window 1331, based on the screen aspect ratio of the first window 1331. According to the embodiment illustrated in FIG. 13, the screen aspect ratio of the first window 1331 may be a ratio in which a horizontal length is greater than a vertical length. In this case, the electronic device 1301 may determine the layout of the screen output on the external electronic device 1302 such that the second window 1332 is disposed on the upper or lower side of the first window 1331.

According to an embodiment, the electronic device 1301 may determine to output, on a first window 1341 of the external electronic device 1302, a first screen corresponding to a first region 1321 on the screen 1320. According to an embodiment, when the electronic device 1301 receives a user input for selecting a first object 1325, the electronic device 1301 may determine to output, on a second window 1342, a second screen corresponding to a second region 1372 including the first object 1325 on the screen 1320.

According to an embodiment, when the electronic device 1301 determines that the type of the first object 1325 is an object, the electronic device 1301 may determine the screen aspect ratio (or, the width to height ratio) at which the second screen corresponding to the second region 1322 is output on the external electronic device 1302 or the screen aspect ratio (or, the width to height ratio) of the second window 1342, based on the width to height ratio of the first object 1325. According to an embodiment, the operation of determining, by the electronic device 1301, the screen aspect ratio at which the second screen corresponding to the second region 1322 is output on the external electronic device 1302 or the screen aspect ratio of the second window 1342 may correspond to an operation of determining, by the electronic device, the width to height ratio of the second region 1322. When the electronic device 1301 determines that the vertical length of the first object 1325 is greater than the horizontal length of the first object 1325, the electronic device 1301 may determine the screen aspect ratio at which the second screen corresponding to the second region 1322 is output on the external electronic device 1302 or the screen aspect ratio of the second window 1342 as a ratio in which a vertical length is greater than a horizontal length.

According to an embodiment, when the electronic device 1301 determines the screen aspect ratio of the second window 1332 as the ratio in which the vertical length is greater than the horizontal length, the electronic device 1301 may determine the layout of the screen output on the external electronic device 1302 such that the second window 1342 is disposed on the left or right side of the first window 1341.

Figure 14:
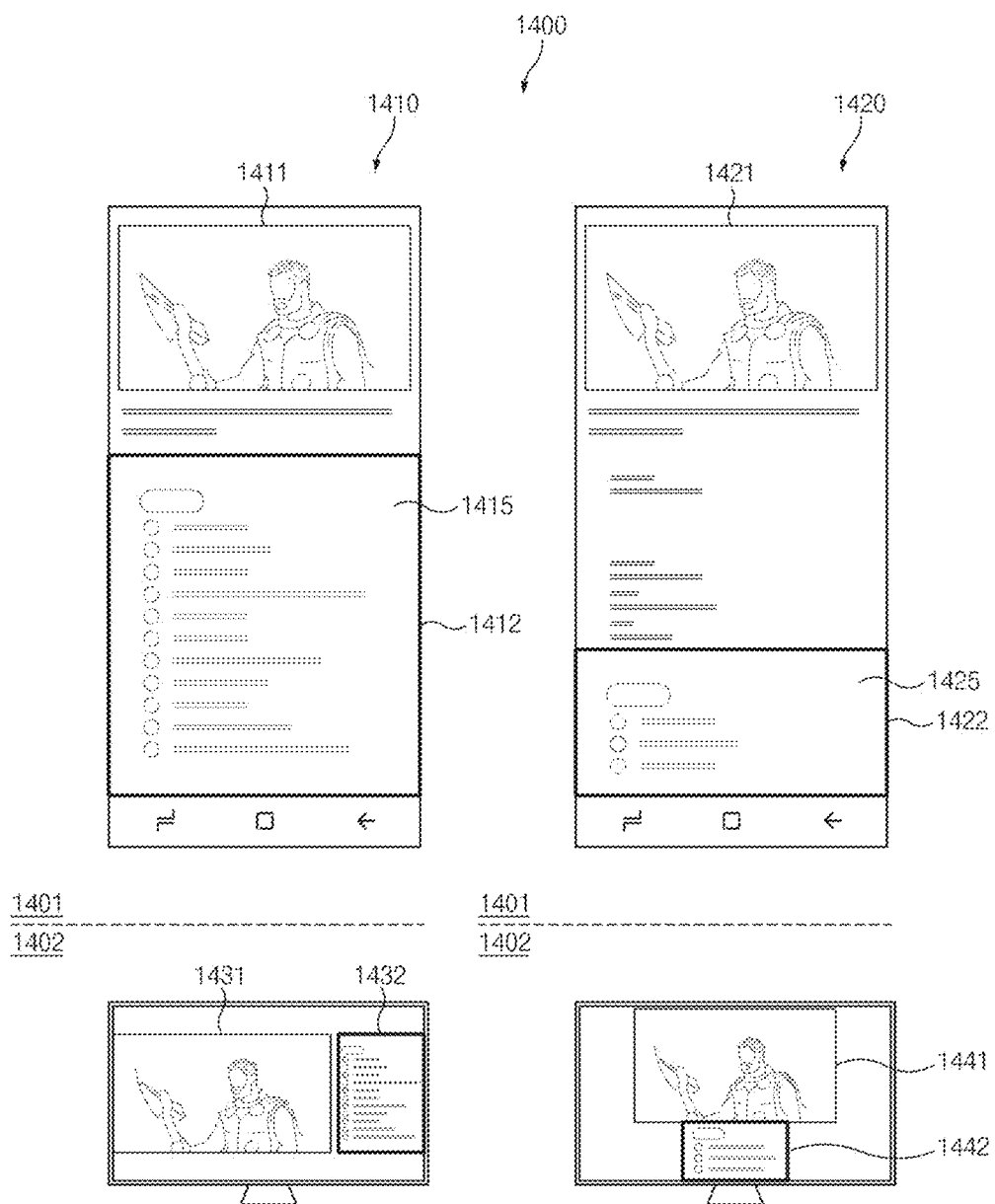
FIG. 14 is a view for explaining an operation of an electronic device according to an embodiment.

FIG. 14 is a view 1400 for explaining an operation of an electronic device according to an embodiment. Operations of the electronic device 1401 (e.g., the electronic device 101 of FIG. 1) that will be described below may be performed by a processor (e.g., the processor 120 of FIG. 1) of the electronic device 1401. According to an embodiment, a screen 1410 or 1420 may be a screen displayed on a display (e.g., the display module 160 of FIG. 1) by the electronic device 1401.

Referring to FIG. 14, the electronic device 1401 may determine to output, on a first window 1431 of an external electronic device 1402, a first screen corresponding to a first region 1411 on the screen 1410. According to an embodiment, when the electronic device 1401 receives a user input for selecting a first object 1415, the electronic device 1401 may determine to output, on a second window 1432, a second screen corresponding to a second region 1412 including the first object 1415 on the screen 1410.

According to an embodiment, when the electronic device 1401 determines that the type of the first object 1415 is text, the electronic device 1401 may determine the screen aspect ratio at which the second screen corresponding to the second region 1412 is output on the external electronic device 1402 or the screen aspect ratio of the second window 1432, based on the width to height ratio of the region where the first object 1415 is output on the screen 1410. According to an embodiment, the region where the first object 1415 is output may be the same as the second region 1412. When the electronic device 1401 determines that the vertical length of the region where the first object 1415 is output is greater than the horizontal length of the region, the electronic device 1401 may determine the screen aspect ratio at which the second screen corresponding to the second region 1412 is output on the external electronic device or the screen aspect ratio of the second window 1432 as a ratio in which a vertical length is greater than a horizontal length.

According to an embodiment, when the electronic device 1401 determines the screen aspect ratio of the second window 1432 as the ratio in which the vertical length is greater than the horizontal length, the electronic device 1401 may determine the layout of the screen output on the external electronic device 1402 such that the second window 1432 is disposed on the left or right side of the first window 1431.

According to an embodiment, the electronic device 1401 may determine to output, on a first window 1441 of the external electronic device 1402, a first screen corresponding to a first region 1421 on the screen 1420. According to an embodiment, when the electronic device 1401 receives a user input for selecting a first object 1425, the electronic device 1401 may determine to output, on a second window 1442, a second screen corresponding to a second region 1422 including the first object 1425 on the screen 1420.

According to an embodiment, when the electronic device 1401 determines that the type of the first object 1425 is text, the electronic device 1401 may determine the screen aspect ratio at which the second screen corresponding to the second region 1422 is output on the external electronic device 1402 or the screen aspect ratio of the second window 1442, based on the width to height ratio of the region where the first object 1425 is output on the screen 1420. According to an embodiment, the region where the first object 1425 is output may be the same as the second region 1422. According to an embodiment, the operation of determining, by the electronic device 1401, the screen aspect ratio at which the second screen corresponding to the second region 1422 is output on the external electronic device 1402 or the screen aspect ratio of the second window 1442 may correspond to an operation of determining, by the electronic device, the width to height ratio of the second region 1422. When the electronic device 1401 determines that the horizontal length of the region where the first object 1425 is output is greater than the vertical length of the region, the electronic device 1401 may determine the screen aspect ratio at which the second screen corresponding to the second region 1422 is output on the external electronic device or the screen aspect ratio of the second window 1442 as a ratio in which a horizontal length is greater than a vertical length.

According to an embodiment, when the electronic device 1401 determines the screen aspect ratio of the second window 1442 as the ratio in which the horizontal length is greater than the vertical length, the electronic device 1401 may determine the layout of the second window 1442 and the first window 1441, based on the screen aspect ratio of the first window 1441. According to the embodiment illustrated in FIG. 14, the screen aspect ratio of the first window 1441 may be a ratio in which a horizontal length is greater than a vertical length. In this case, the electronic device 1401 may determine the layout of the screen output on the external electronic device 1402 such that the second window 1442 is disposed on the upper or lower side of the first window 1441.

Hereinafter, an operation of determining a screen output on a focus window of an external electronic device by an electronic device according to an embodiment will be described with reference to FIG. 15.

Figure 15:
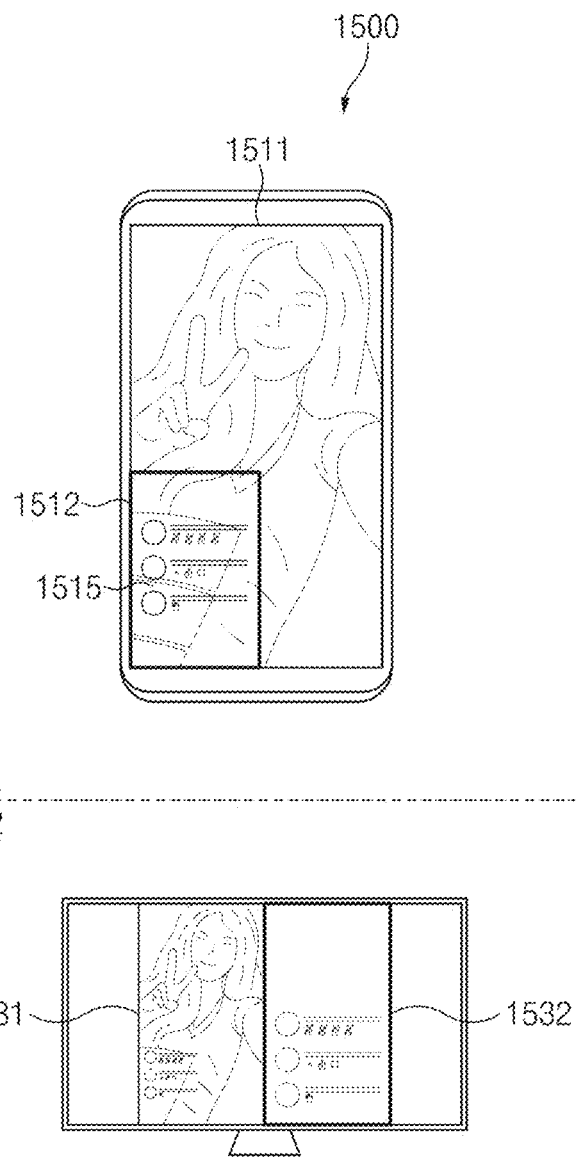
FIG. 15 is a view for explaining an operation of an electronic device according to an embodiment.

FIG. 15 is a view 1500 for explaining an operation of the electronic device according to an embodiment. Operations of the electronic device 1501 (e.g., the electronic device 101 of FIG. 1) that will be described below may be performed by a processor (e.g., the processor 120 of FIG. 1) of the electronic device 1501.

Referring to FIG. 15, the electronic device 1501 may determine to output, on a first window 1531 of the external electronic device 1502, a first screen corresponding to a first region 1511 on a screen output on a display. According to an embodiment when the electronic device 1501 receives a user input for selecting a first object 1515, the electronic device 1501 may determine to output, on a second window 1532, a second screen corresponding to a second region 1512 including the first object 1515 on the screen. According to an embodiment, the electronic device 1501 may perform the following image processing operation before outputting the second screen on second window 1532.

According to an embodiment, when the electronic device 1501 determines that the type of the first object 1515 is text, the electronic device 1501 may determine whether the background of the region where the first object 1515 is output on the screen output on the display changes as time passes. For example, the electronic device 1501 may output the first object 1515 such that the first object 1515 overlaps a video or a live video. In this case, the electronic device 1501 may determine that the background of the region where the first object 1515 is output changes as time passes.

According to an embodiment, when the electronic device 501 determines that the type of the first object 1515 is text and the background of the region where the first object 1515 is output changes as time passes, the electronic device 1501 may adjust the background of the region where the first object 1515 is output on the screen output on the external electronic device. For example, the electronic device 1501 may blur the background of the second screen corresponding to the second region 1512 including the first object 1515, or may adjust the brightness of the background of the second region such that the background appears dark or bright. According to an embodiment, the electronic device 1501 may perform control to output the second screen, the background of which is adjusted, on the second window 1532 of the screen output on the external electronic device.

According to the above-described embodiments, the electronic device 1501 may increase the visibility of text on the screen that is output on the external electronic device 1502.

According to an embodiment of the disclosure, an electronic device (e.g., the electronic device 101 of FIG. 1, the electronic device 401 of FIG. 4, the electronic device 601 of FIG. 6, the electronic device 1001 of FIG. 10, the electronic device 1301 of FIG. 13, the electronic device 1401 of FIG. 14, or the electronic device 1501 of FIG. 15) may include communication circuitry (e.g., the communication module 190 of FIG. 1), a display (e.g., the display module 160 of FIG. 1), a memory (e.g., the memory 130 of FIG. 1), and a processor (e.g., the processor 120 of FIG. 1) operationally connected to the communication circuitry, the display, and the memory. The memory may store one or more instructions that, when executed, cause the processor to establish a communication connection for screen sharing with an external electronic device (e.g., the electronic device 102 of FIG. 1, the electronic device 104 of FIG. 1, the external electronic device 402 of FIG. 4, the external electronic device 602 of FIG. 6, the external electronic device 1002 of FIG. 10, the external electronic device 1302 of FIG. 13, the external electronic device 1402 of FIG. 14, or the external electronic device 1502 of FIG. 15) through the communication circuitry, determine a first region shared with the external electronic device on a screen that is output on the display, identify a second region selected on the screen based on a user input, and transmit, to the external electronic device, image data about a third screen obtained by combining a first screen corresponding to the first region and a second screen corresponding to the second region.

According to an embodiment of the disclosure, the instructions may cause the processor to identify a type of an object included in the second region and determine a layout of the third screen, based on the type of the object, and the layout may include a width to height ratio of the second region and a position of the second screen relative to the first screen on the third screen.

According to an embodiment of the disclosure, the instructions may cause the processor to determine the width to height ratio of the second region as a ratio in which a vertical length is greater than a horizontal length, when it is determined that the type of the object is a person.

According to an embodiment of the disclosure, the instructions may cause the processor to identify a width to height ratio of the object, determine the width to height ratio of the second region as a ratio in which a vertical length is greater than a horizontal length, when it is determined that a vertical length of the object is greater than a horizontal length of the object, and determine the width to height ratio of the second region as a ratio in which a horizontal length is greater than a vertical length, when it is determined that the horizontal length of the object is greater than the vertical length of the object.

According to an embodiment of the disclosure, the instructions may cause the processor to determine to locate the second screen on a left or right side of the first screen on the third screen, when it is determined that a vertical length of the second region is greater than a horizontal length of the second region and determine the position of the second screen relative to the first screen on the third screen depending on a width to height ratio of the first region, when it is determined that the horizontal length of the second region is greater than the vertical length of the second region.

According to an embodiment of the disclosure, the instructions may cause the processor to determine to locate the second screen on an upper or lower side of the first screen on the third screen, when it is determined that the horizontal length of the second region is greater than the vertical length of the second region and a horizontal length of the first region is greater than a vertical length of the first region and determine to locate the second screen on the left or right side of the first screen on the third screen, when it is determined that the horizontal length of the second region is greater than the vertical length of the second region and the vertical length of the first region is greater than the horizontal length of the first region.

According to an embodiment of the disclosure, the instructions may cause the processor to identify a type of an object included in the second region, determine whether a background of the object changes on the second screen as time passes, when it is determined that the type of the object is text, and form the third screen by combining a fourth screen obtained by adjusting the background of the object on the second screen with the first screen.

According to an embodiment of the disclosure, the instructions may cause the processor to recognize an object included in the second region, track a position of the recognized object on the screen, and determine a region including the object, the position of which is tracked, as the second region.

According to an embodiment of the disclosure, the instructions may cause the processor to form the third screen by combining the second screen at a time point when the position of the object was most recently recognized with the first screen when the position of the object is not recognized on the screen.

According to an embodiment of the disclosure, the instructions may cause the processor to receive a user input for selection of at least one region of the screen and recognize at least one object included in the selected at least one region, display at least one image corresponding to a region including the recognized at least one object on the display, and receive a user input for selection of a first image among the at least one image and identify the second region including a first object corresponding to the selected first image.

According to an embodiment of the disclosure, a method for sharing a screen with an external electronic device (e.g., the electronic device 102 of FIG. 1, the electronic device 104 of FIG. 1, the external electronic device 402. of FIG. 4, the external electronic device 602 of FIG. 6, the external electronic device 1002 of FIG. 10, the external electronic device 1302 of FIG. 13, the external electronic device 1402 of FIG. 14, or the external electronic device 1502 of FIG. 15) by an electronic device (e.g., the electronic device 101 of FIG. 1, the electronic device 401 of FIG. 4, the electronic device 601 of FIG. 6, the electronic device 1001 of FIG. 10, the electronic device 1301 of FIG. 13, the electronic device 1401 of FIG. 14, or the electronic device 1501 of FIG. 15) may include establishing a communication connection for screen sharing with the external electronic device through communication circuitry (e.g., the communication module 190 of FIG. 1) of the electronic device, determining a first region shared with the external electronic device on a screen that is output on a display (e.g., the display module 160 of FIG. 1) of the electronic device, identifying a second region selected on the screen based on a user input, and transmitting, to the external electronic device, image data about a third screen obtained by combining a first screen corresponding to the first region and a second screen corresponding to the second region.

According to an embodiment of the disclosure, the method may further include identifying a type of an object included in the second region and determining a layout of the third screen, based on the type of the object, and the layout may include a width to height ratio of the second region and a position of the second screen relative to the first screen on the third screen.

According to an embodiment of the disclosure, the method may further include determining the width to height ratio of the second region as a ratio in which a vertical length is greater than a horizontal length, when it is determined that the type of the object is a person.

According to an embodiment of the disclosure, the method may further include identifying a width to height ratio of the object, determining the width to height ratio of the second region as a ratio in which a vertical length is greater than a horizontal length, when it is determined that a vertical length of the object is greater than a horizontal length of the object, and determining the width to height ratio of the second region as a ratio in which a horizontal length is greater than a vertical length, when it is determined that the horizontal length of the object is greater than the vertical length of the object.

According to an embodiment of the disclosure, the method may further include determining to locate the second screen on a left or right side of the first screen on the third screen, when it is determined that a vertical length of the second region is greater than a horizontal length of the second region and determining the position of the second screen dative to the first screen on the third screen depending on a width to height ratio of the first region, when it is determined that the horizontal length of the second region is greater than the vertical length of the second region.

According to an embodiment of the disclosure, the method may further include determining to locate the second screen on an upper or lower side of the first screen on the third screen, when it is determined that the horizontal length of the second region is greater than the vertical length of the second region and a horizontal length of the first region is greater than a vertical length of the first region and determining to locate the second screen on e left or right side of the first screen on the third screen, when it is determined that the horizontal length of the second region is greater than the vertical length of the second region and the vertical length of the first region is greater than the horizontal length of the first region.

According to an embodiment of the disclosure, the method may further include identifying a type of an object included in the second region, determining whether a background of the object changes on the second screen as time passes, when it is determined that the type of the object is text, and forming the third screen by combining a fourth screen obtained by adjusting the background of the object on the second screen with the first screen.

According to an embodiment of the disclosure, the method may further include recognizing an object included in the second region, tracking a position of the recognized object on the screen, and determining a region including the object, the position of which is tracked, as the second region.

According to an embodiment of the disclosure, the method may further include forming the third screen by combining the second screen at a time point when the position of the object was most recently recognized with the first screen when the position of the object is not recognized on the screen.

According to an embodiment of the disclosure, the method may further include receiving a user input for selection of at least one region of the screen and recognizing at least one object included in the selected at least one region, displaying at least one image corresponding to a region including the recognized at least one object on the display, and receiving a user input for selection of a first image among the at least one image and identifying the second region including a first object corresponding to the selected first image.

According to an embodiment of the disclosure, a computer program product stored on a machine-readable storage medium includes instructions that, when executed, cause a processor (e.g., the processor 120 of FIG. 1) of an electronic device (e.g., the electronic device 101 of FIG. 1, the electronic device 401 of FIG. 4, the electronic device 601 of FIG. 6, the electronic device 1001 of FIG. 10, the electronic device 1301 of FIG. 13, the electronic device 1401 of FIG. 14, or the electronic device 1501 of FIG. 15) to establish a communication connection for screen sharing with an external electronic device (e.g., the electronic device 102 of FIG. 1, the electronic device 104 of FIG. 1, the external electronic device 402 of FIG. 4, the external electronic device 602 of FIG. 6, the external electronic device 1002 of FIG. 10, the external electronic device 1302 of FIG. 13, the external electronic device 1402 of FIG. 14, or the external electronic device 1502 of FIG. 15), determine a first region shared with the external electronic device on a screen that is output on a display (e.g., the display module 160 of FIG. 1) of the electronic device, identify a second region selected on the screen based on a user input, and transmit, to the external electronic device, image data about a third screen obtained by combining a first screen corresponding to the first region and a second screen corresponding to the second region.

What is claimed is:

1. An electronic device comprising:
communication circuitry;
a display;
memory; and
a processor operationally connected to the communication circuitry, the display, and the memory,
wherein the memory stores one or more instructions that, when executed by the processor, cause the electronic device to:
establish a communication connection for screen sharing with an external electronic device through the communication circuitry;
determine a first region shared with the external electronic device on a screen that is output on the display;
identify a second region selected on the first region based on a user input; and
transmit, to the external electronic device, image data about a third screen obtained by combining a first screen corresponding to the first region and a second screen corresponding to the second region,
wherein the second region includes a part of the first region,
wherein an enlargement magnification of the first region is different from an enlargement magnification of the second region,
wherein a layout of the third screen is determined based on an object included in the second region,
wherein the layout includes a width to height ratio of the second region, and
wherein the instructions that, when executed by the processor, cause the electronic device to:
identify the object included in the second region;
identify a width to height ratio of the object;
determine a width to height ratio of the second region as a ratio in which a vertical length is greater than a horizontal length, when it is determined that a vertical length of the object is greater than a horizontal length of the object; and
determine the width to height ratio of the second region as a ratio in which a horizontal length is greater than a vertical length, when it is determined that the horizontal length of the object is greater than the vertical length of the object.

2. The electronic device of claim 1,
wherein the layout further includes a position of the second screen relative to the first screen on the third screen.

3. The electronic device of claim 2, wherein the instructions that, when executed by the processor, cause the electronic device to:
identify a type of the object included in the second region; and
determine the width to height ratio of the second region as a ratio in which a vertical length is greater than a horizontal length, when it is determined that the type of the object is a person.

4. The electronic device of claim 2, wherein the instructions that, when executed by the processor, cause the electronic device to:
determine to locate the second screen on a left or right side of the first screen on the third screen, when it is determined that a vertical length of the second region is greater than a horizontal length of the second region; and
determine the position of the second screen relative to the first screen on the third screen depending on a width to height ratio of the first region, when it is determined that the horizontal length of the second region is greater than the vertical length of the second region.

5. The electronic device of claim 4, wherein the instructions that, when executed by the processor, cause the electronic device to:
determine to locate the second screen on an upper or lower side of the first screen on the third screen, when it is determined that the horizontal length of the second region is greater than the vertical length of the second region and a horizontal length of the first region is greater than a vertical length of the first region; and
determine to locate the second screen on the left or right side of the first screen on the third screen, when it is determined that the horizontal length of the second region is greater than the vertical length of the second region and the vertical length of the first region is greater than the horizontal length of the first region.

6. The electronic device of claim 1, wherein the instructions that, when executed by the processor, cause the electronic device to:
identify a type of the object included in the second region;
determine whether a background of the object changes on the second screen as time passes, when it is determined that the type of the object is text; and
form the third screen by combining a fourth screen obtained by adjusting the background of the object on the second screen with the first screen.

7. The electronic device of claim 1, wherein the instructions that, when executed by the processor, cause the electronic device to:
identify the object included in the second region;
track a position of the identified object on the screen; and
determine a region including the object, the position of which is tracked, as the second region.

8. The electronic device of claim 7, wherein the instructions that, when executed by the processor, cause the electronic device to:
form the third screen by combining the second screen at a time point when the position of the object was most recently identified with the first screen, when the position of the object is not identified on the screen.

9. The electronic device of claim 1, wherein the instructions that, when executed by the processor, cause the electronic device to:
receive a user input for selection of at least one region of the first screen and identify at least one object included in the selected at least one region;
display at least one image corresponding to a region including the identified at least one object on the display; and
receive a user input for selection of a first image among the at least one image and identify the second region including a first object corresponding to the selected first image.

10. A method for sharing, by an electronic device, a screen with an external electronic device, the method comprising:
establishing a communication connection for screen sharing with the external electronic device through communication circuitry of the electronic device;

determining a first region shared with the external electronic device on a screen that is output on a display of the electronic device;
identifying a second region selected on the first region based on a user input; and
transmitting, to the external electronic device, image data about a third screen obtained by combining a first screen corresponding to the first region and a second screen corresponding to the second region,
wherein the second region includes a part of the first region,
wherein an enlargement magnification of the first region is different from an enlargement magnification of the second region,
wherein the combining the first screen corresponding to the first region and the second screen corresponding to the second region comprising determining a layout of the third screen, based on an object included in the second region,
wherein the layout includes a width to height ratio of the second region, and
wherein the determining the layout of the third screen comprising:
identifying the object included in the second region;
identifying a width to height ratio of the object;
determining a width to height ratio of the second region as a ratio in which a vertical length is greater than a horizontal length, when it is determined that a vertical length of the object is greater than a horizontal length of the object; and
determining the width to height ratio of the second region as a ratio in which a horizontal length is greater than a vertical length, when it is determined that the horizontal length of the object is greater than the vertical length of the object.

11. The method of claim 10,
wherein the layout further includes a position of the second screen relative to the first screen on the third screen.

12. The method of claim 11, further comprising:
identifying a type of the object included in the second region; and
determining the width to height ratio of the second region as a ratio in which a vertical length is greater than a horizontal length, when it is determined that the type of the object is a person.

13. The method of claim 11, further comprising:
determining to locate the second screen on a left or right side of the first screen on the third screen, when it is determined that a vertical length of the second region is greater than a horizontal length of the second region; and
determining the position of the second screen relative to the first screen on the third screen depending on a width to height ratio of the first region, when it is determined that the horizontal length of the second region is greater than the vertical length of the second region.

14. The method of claim 13, further comprising:
determining to locate the second screen on an upper or lower side of the first screen on the third screen, when it is determined that the horizontal length of the second region is greater than the vertical length of the second region and a horizontal length of the first region is greater than a vertical length of the first region; and
determining to locate the second screen on the left or right side of the first screen on the third screen, when it is determined that the horizontal length of the second region is greater than the vertical length of the second region and the vertical length of the first region is greater than the horizontal length of the first region.

15. The method of claim 10, further comprising:
identifying a type of the object included in the second region;
determining whether a background of the object changes on the second screen as time passes, when it is determined that the type of the object is text; and
forming the third screen by combining a fourth screen obtained by adjusting the background of the object on the second screen with the first screen.

16. The method of claim 10, further comprising:
identifying an object included in the second region;
tracking a position of the identified object on the screen;
determining a region including the object, the position of which is tracked, as the second region; and
forming the third screen by combining the second screen at a time point when the position of the object was most recently identified with the first screen, when the position of the object is not identified on the screen.

17. The method of claim 10, further comprising:
receiving a user input for selection of at least one region of the first screen and identifying at least one object included in the selected at least one region;
displaying at least one image corresponding to a region including the identified at least one object on the display; and
receiving a user input for selection of a first image among the at least one image and identifying the second region including a first object corresponding to the selected first image.

18. A computer program product stored on a non-transitory machine-readable storage medium comprising instructions that, when executed by a processor of an electronic device, cause the electronic device to:
establish a communication connection for screen sharing with an external electronic device;
determine a first region shared with the external electronic device on a screen that is output on a display of the electronic device;
identify a second region selected on the first region based on a user input; and
transmit, to the external electronic device, image data about a third screen obtained by combining a first screen corresponding to the first region and a second screen corresponding to the second region,
wherein the second region includes a part of the first region,
wherein an enlargement magnification of the first region is different from an enlargement magnification of the second region,
wherein a layout of the third screen is determined based on an object included in the second region,
wherein the layout includes a width to height ratio of the second region, and
wherein the instructions that, when executed by the processor, cause the electronic device to:
identify the object included in the second region;
identify a width to height ratio of the object;
determine a width to height ratio of the second region as a ratio in which a vertical length is greater than a horizontal length, when it is determined that a vertical length of the object is greater than a horizontal length of the object; and
determine the width to height ratio of the second region as a ratio in which a horizontal length is greater than a vertical length, when it is determined that the horizontal length of the object is greater than the vertical length of the object.

\* \* \* \* \*